United States Patent
Ito et al.

(10) Patent No.: US 11,922,798 B2
(45) Date of Patent: Mar. 5, 2024

(54) CONTROL DEVICE AND CONTROL METHOD

(71) Applicant: SONY GROUP CORPORATION, Tokyo (JP)

(72) Inventors: Osamu Ito, Tokyo (JP); Takeshi Ogita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 76 days.

(21) Appl. No.: 17/626,564

(22) PCT Filed: Jul. 14, 2020

(86) PCT No.: PCT/JP2020/027332
§ 371 (c)(1),
(2) Date: Jan. 12, 2022

(87) PCT Pub. No.: WO2021/015051
PCT Pub. Date: Jan. 28, 2021

(65) Prior Publication Data
US 2022/0383710 A1 Dec. 1, 2022

(30) Foreign Application Priority Data

Jul. 23, 2019 (JP) ................................ 2019-135573

(51) Int. Cl.
*H04B 3/36* (2006.01)
*G08B 6/00* (2006.01)

(52) U.S. Cl.
CPC ..................................... *G08B 6/00* (2013.01)

(58) Field of Classification Search
CPC ........... G08B 6/00; G01H 11/08; G06F 3/016; G06F 3/04166; B06B 1/06; B06B 2201/55
See application file for complete search history.

(56) References Cited

U.S. PATENT DOCUMENTS

| 7,755,607 B2 * | 7/2010 | Poupyrev | G06F 1/1684 345/173 |
| 2011/0074733 A1 * | 3/2011 | Makinen | G06F 3/016 345/174 |

(Continued)

FOREIGN PATENT DOCUMENTS

| CN | 103189822 A | 7/2013 |
| JP | 2002-281770 A | 9/2002 |

(Continued)

OTHER PUBLICATIONS

International Search Report and Written Opinion of PCT Application No. PCT/JP2020/027332, dated Oct. 20, 2020, 09 pages of ISRWO.

*Primary Examiner* — Toan N Pham
(74) *Attorney, Agent, or Firm* — CHIP LAW GROUP

(57) ABSTRACT

A control device includes a detection unit, a specifying unit, and a phase offset control unit. The detection unit detects a contact position on a display provided with a plurality of drive units that performs tactile presentation. The specifying unit specifies, based on the contact position detected by the detection unit, a target phase offset, which is a phase offset being an acquisition target of a plurality of drive signals each of which drives each of the plurality of drive units. The phase offset control unit adjusts the phase offset of the plurality of drive signals so as to obtain the target phase offset specified by the specifying unit.

18 Claims, 15 Drawing Sheets

(56) References Cited

U.S. PATENT DOCUMENTS

| | | | | |
|---|---|---|---|---|
| 2012/0232780 A1* | 9/2012 | Delson | .................... | A63F 13/24 |
| | | | | 340/407.1 |
| 2013/0229384 A1 | 9/2013 | Adachi et al. | | |
| 2014/0139327 A1* | 5/2014 | Bau | ........................ | G06F 3/016 |
| | | | | 340/407.1 |
| 2020/0387224 A1* | 12/2020 | Das | ....................... | B06B 1/0207 |

FOREIGN PATENT DOCUMENTS

| JP | 2008-216381 A | 9/2008 |
|---|---|---|
| WO | 2013/057894 A1 | 4/2013 |

\* cited by examiner

CONTROL DEVICE AND CONTROL METHOD

CROSS REFERENCE TO RELATED APPLICATIONS

This application is a U.S. National Phase of International Patent Application No. PCT/JP2020/027332 filed on Jul. 14, 2020, which claims priority benefit of Japanese Patent Application No. JP 2019-135573 filed in the Japan Patent Office on Jul. 23, 2019. Each of the above-referenced applications is hereby incorporated herein by reference in its entirety.

FIELD

The present disclosure relates to a control device, a control method, and a control program.

BACKGROUND

A device having a touch panel, such as a smartphone or a tablet device, is sometimes equipped with a tactile presentation device that reproduces a tactile sense. Such a device needs to be able to perform tactile presentation with a uniform tactile intensity even at any position on the touch panel touched by a user.

CITATION LIST

Patent Literature

Patent Literature 1: U.S. Pat. No. 7,755,607 B2

SUMMARY

Technical Problem

However, the tactile intensity might vary depending on the position at which the tactile device is disposed.

In view of this, the present disclosure proposes a control device, a control method, and a control program capable of reproducing tactile presentation with a uniform tactile intensity regardless of user contact positions.

Solution to Problem

To solve the problems described above, a control device according to the present disclosure includes a detection unit, a specifying unit, and a phase offset control unit. The detection unit detects a contact position on a display provided with a plurality of drive units that performs tactile presentation. The specifying unit specifies, based on the contact position detected by the detection unit, a target phase offset, which is a phase offset being an acquisition target of a plurality of drive signals each of which drives each of the plurality of drive units. The phase offset control unit adjusts the phase offset of the plurality of drive signals so as to obtain the target phase offset specified by the specifying unit.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

First Embodiment

Tactile presentation can be performed by disposing a drive unit such as a piezoelectric element inside a housing of a touch panel display of a device such as a smartphone or a tablet device. In this case, by disposing the plurality of piezoelectric elements in the touch panel display, it is possible to perform high-intensity and wide-range tactile presentation.

In a case of disposing a plurality of drive units in the touch panel display, there is also a conceivable method of individually driving the drive units. However, the method of individually driving the drive units has a problem that since the number of currently driving drive units is one, a region that can be used for tactile presentation would be smaller as compared with a case where a plurality of drive units is simultaneously driven.

Figure 1:
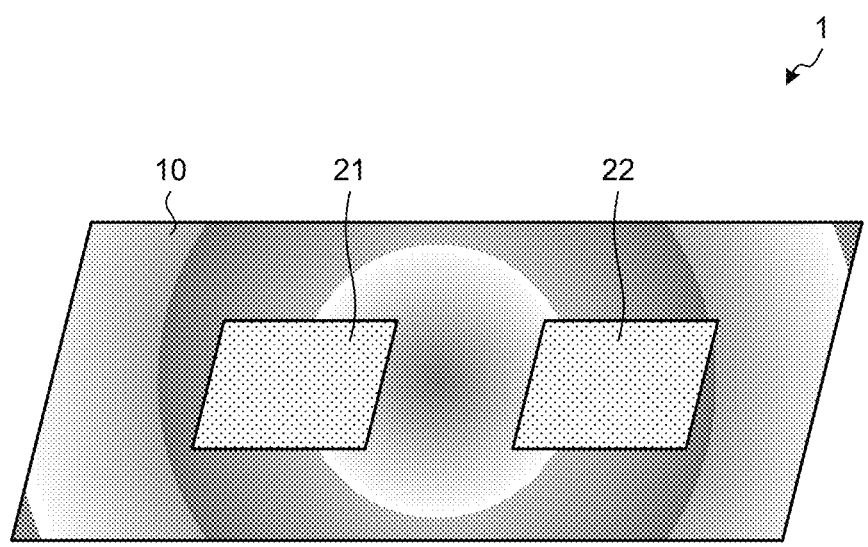
FIG. 1 is a view illustrating tactile presentation on a touch panel display.

To overcome this problem, there is another conceivable, that is, a method of simultaneously driving a plurality of drive units. Here, FIG. 1 is a view illustrating tactile presentation on a touch panel display 10. The information processing device 1 such as a smartphone or a tablet device includes the touch panel display 10. The touch panel display 10 includes, inside its housing, drive units such as a first drive unit 21 and a second drive unit 22.

When the first drive unit 21 and the second drive unit 22 are simultaneously driven, vibration of the first drive unit 21 and vibration of the second drive unit 22 can act on each other, which might cause a region where the vibration is canceled. This means occurrence of a region where tactile presentation cannot be performed. In the touch panel display 10 illustrated in FIG. 1, dark color regions indicate regions having high tactile presentation intensity, while light color regions indicate regions having low tactile presentation intensity. In the case of FIG. 1, a region having high tactile presentation intensity and a region having low tactile presentation intensity are alternately arranged concentrically from substantially the center of the touch panel display 10. Furthermore, the region having low tactile presentation intensity is not limited to a concentric shape, and may have a different shape.

For example, when a crest of a vibration generated when the first drive unit 21 is driven and a trough of a vibration generated when the second drive unit 22 is driven might overlap each other, the vibrations will be canceled. To handle this, by shifting the phase of the vibration generated when the first drive unit 21 is driven and the phase of the vibration generated when the second drive unit 22 is driven at the position where the vibrations of the touch panel display 10 are canceled, it is possible to prevent the cancellation of the vibrations.

That is, by controlling the phases of the drive signals that drive the first drive unit 21 and the second drive unit 22 for individual regions of the touch panel display 10, it is possible to prevent cancellation of the tactile presentation. However, changing the waveform of the drive signal abruptly in order to shift the phase of the drive signal would lead to problems including an occurrence of abnormal noise from the first drive unit 21 and the second drive unit 22 or an occurrence of a failure in the units to follow the change in the drive signal.

Figure 2:
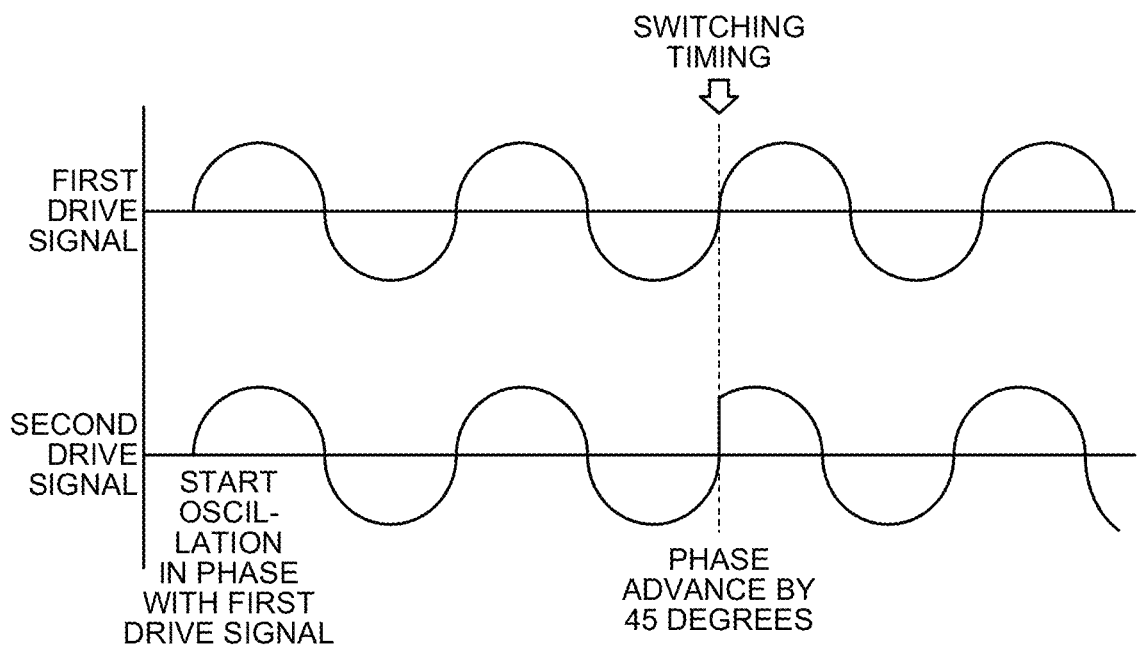
FIG. 2 is a diagram illustrating an example of a drive signal to be input to a first drive unit or a second drive unit.
Figure 3:
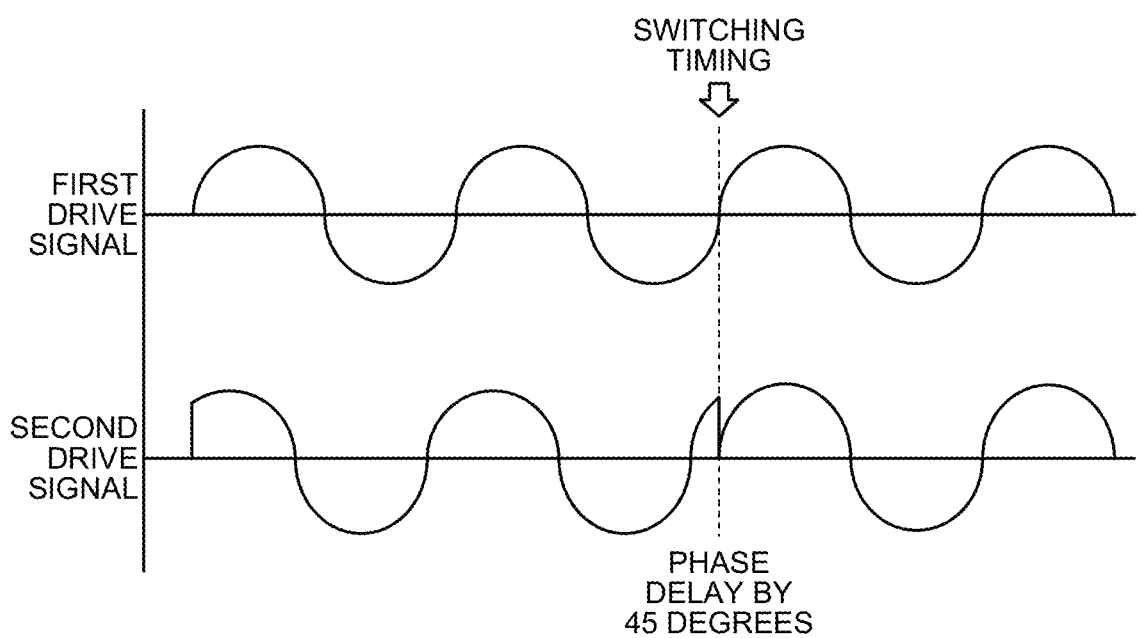
FIG. 3 is a diagram illustrating an example of a drive signal to be input to a first drive unit or a second drive unit.

Here, FIG. 2 is a diagram illustrating an example of a drive signal to be input to the first drive unit 21 or the second drive unit 22. FIG. 3 is a diagram illustrating an example of a drive signal to be input to the first drive unit 21 or the second drive unit 22. FIG. 2 illustrates a case of advancing the phase of the second drive signal. FIG. 3 illustrates a case of delaying the phase of the advanced second drive signal.

The first drive signal illustrated in FIG. 2 indicates a waveform of a voltage to be applied to the first drive unit 21. In addition, the second drive signal indicates a waveform of a voltage to be applied to the second drive unit 22. The second drive signal illustrated in FIG. 2 starts oscillation in phase with the first drive signal. Thereafter, the user has changed the contact position on the touch panel display 10 at the switching timing illustrated in FIG. 2, and thus, the phase of the second drive signal is advanced by 45 degrees. In this manner, when the phase of the second drive signal is abruptly advanced by 45 degrees, the second drive unit 22 might generate abnormal noise. In addition, the second drive unit 22 might fail to follow the waveform of the second drive signal.

In another case, the user has changed the contact position on the touch panel display 10 at the switching timing illustrated in FIG. 3, and thus, the phase of the second drive signal, which has been once advanced by 45 degrees, is then delayed by 45 degrees. Also in this case, there is a possibility that the second drive unit 22 generates abnormal noise. In addition, the second drive unit 22 might fail to follow the waveform of the second drive signal.

Figure 4:
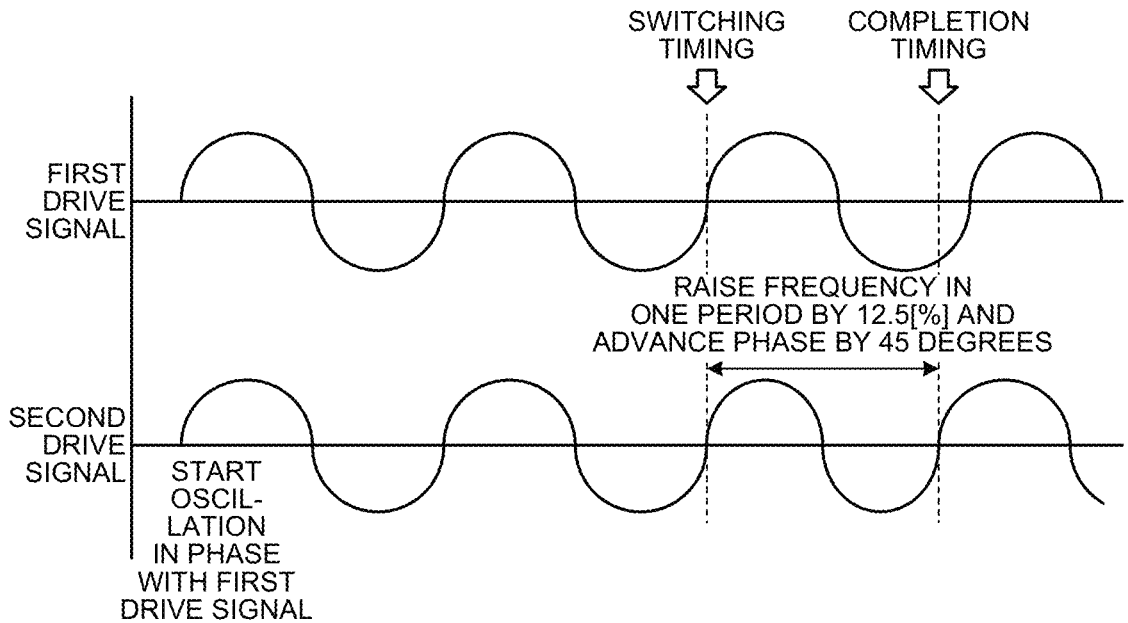
FIG. 4 is a diagram illustrating phase change according to a first embodiment of the present disclosure.
Figure 5:
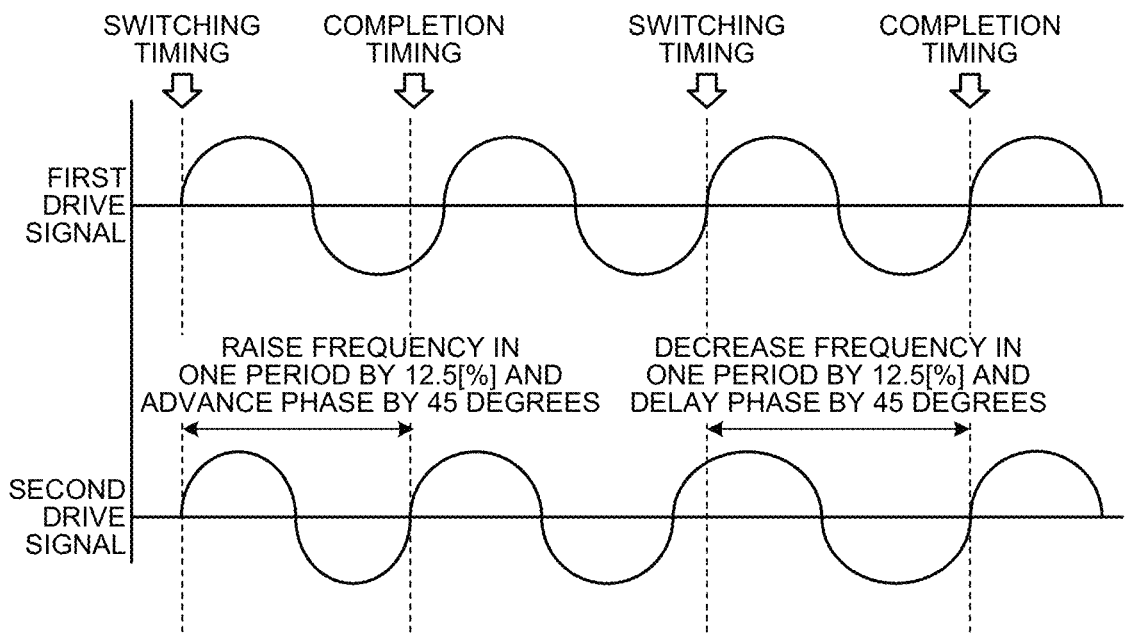
FIG. 5 is a diagram illustrating phase change according to the first embodiment of the present disclosure.

In view of this circumstance, a control device 30 (refer to FIG. 7) according to the first embodiment changes the frequency to change the phase. Here, FIG. 4 is a diagram illustrating a phase change according to the first embodiment of the present disclosure. FIG. 5 is a diagram illustrating a phase change according to the first embodiment of the present disclosure.

As illustrated in FIG. 4, when the user changes the contact position on the touch panel display 10, the control device 30 starts changing the phase. More specifically, the control device 30 raises the frequency by 12.5 percent in one period to advance the phase of the second drive signal by 45 degrees. Thereafter, when one period has elapsed, the control device 30 lowers the frequency of the second drive signal by 12.5 percent. That is, the control device 30 returns the frequency of the second drive signal to the original frequency.

In addition, in the case of delaying the phase by 45 degrees, the control device 30 lowers the frequency by 12.5 percent in one period as illustrated in FIG. 5 and delays the phase of the second drive signal by 45 degrees by this operation. Thereafter, when one period has elapsed, the control device 30 raises the frequency of the second drive signal by 12.5 percent. That is, the control device 30 returns the frequency of the second drive signal to the original frequency. In addition, the control device 30 may obtain a desired phase offset by changing the frequency from the 0 levels as illustrated in FIG. 4 or may obtain a desired phase offset by changing the frequency at a level other than 0 as illustrated in FIG. 5.

Figure 6:
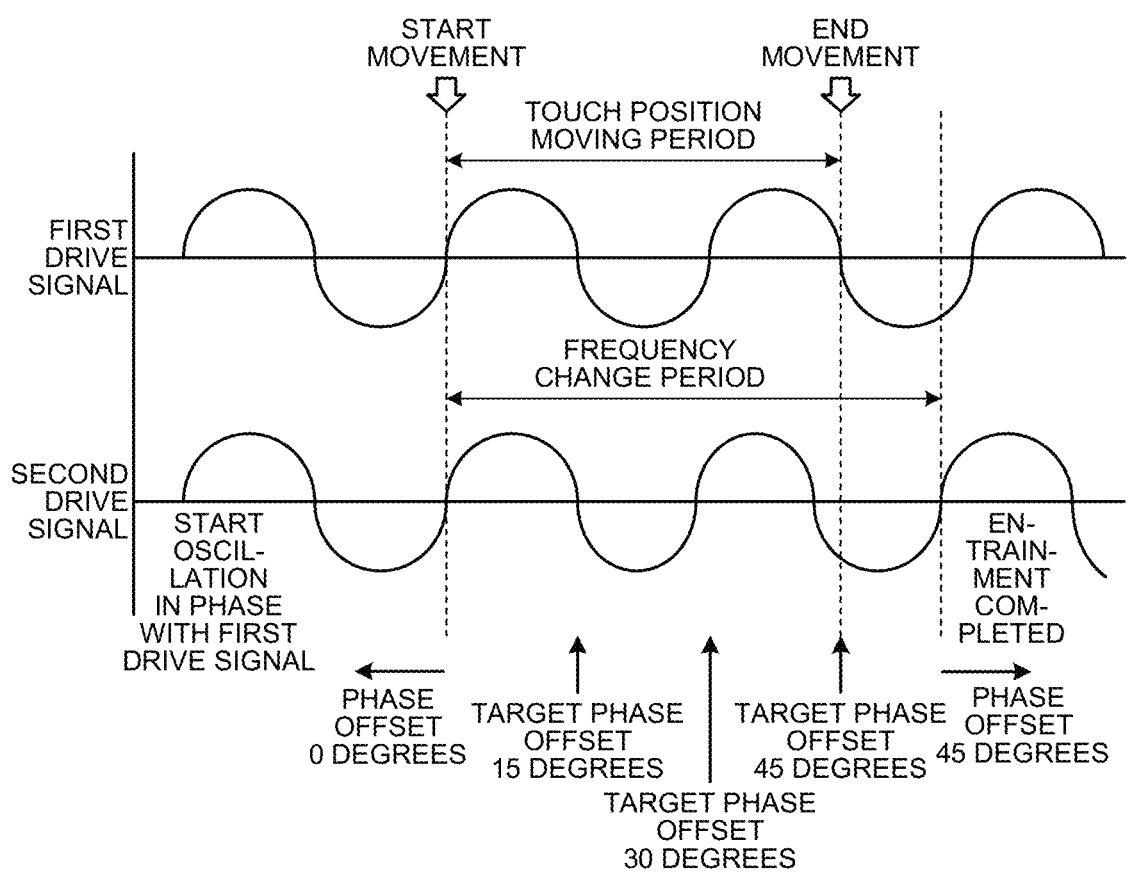
FIG. 6 is a diagram illustrating phase change according to the first embodiment of the present disclosure.

Next, operations of the first drive signal and the second drive signal in a case where the user changes the touch position will be described. Here, FIG. 6 is a diagram illustrating a phase change according to the first embodiment of the present disclosure. When the user has changed the touch position from a certain movement start position to a certain movement end position on the touch panel display 10, the movement might pass through one or more regions. In such a case, it would be desirable to set the phase offset according to each of the regions.

However, as illustrated in FIG. 6, in a case where the time required for the movement of the user touch position is shorter than the time required for the change of frequency, the change of frequency might not be completed even when the movement of the touch position ends. In such a case, the control device 30 continues the control of changing the frequency until the change of the frequency is completed. Accordingly, the control device 30 completes the change of frequency after the end of the movement.

FIG. 6 illustrates a case where the movement of the touch position passes through a region where the phase offset being an acquisition target, namely, the target phase offset is 15 degrees and a region where the target phase offset is 30 degrees, and then is completed in a region where the target phase offset is 45 degrees. In addition, the control device 30 has not completed the change of the phase offset even after the end of movement of touch position. Accordingly, the control device 30 continues changing the phase offset even after the end of the movement of the touch position.

[Hardware Configuration of Information Processing Device 1 According to First Embodiment]

Figure 7:
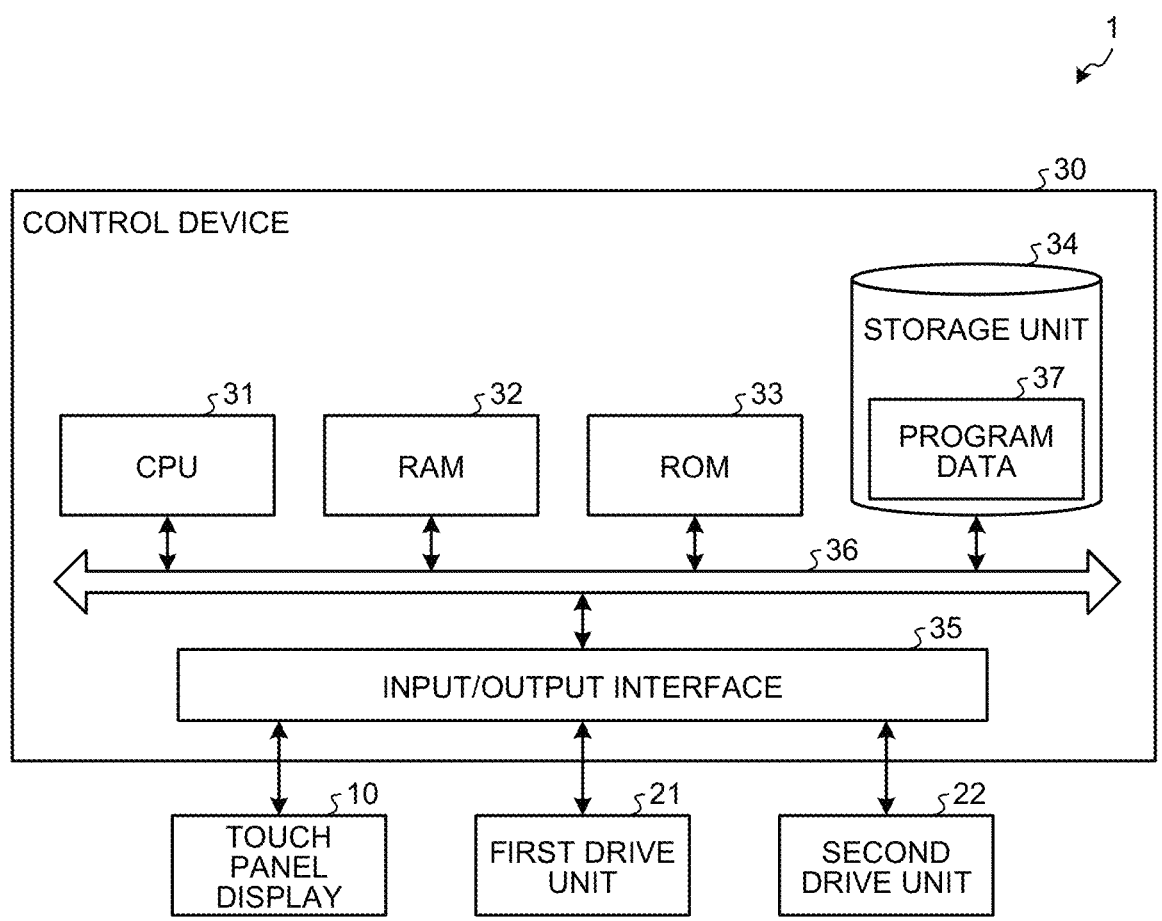
FIG. 7 is a block diagram illustrating a hardware configuration example of an information processing device according to the first embodiment of the present disclosure.

Next, a hardware configuration of the information processing device 1 according to the first embodiment will be described. FIG. 7 is a block diagram illustrating a hardware configuration example of the information processing device 1 according to the first embodiment of the present disclosure. The information processing device 1 includes a control device 30, a touch panel display 10, a first drive unit 21, and a second drive unit 22. The control device 30 is a device that controls the information processing device 1, and is a device that controls the first drive unit 21 and the second drive unit 22.

The touch panel display 10 is a display device that receives a touch operation. Furthermore, the touch panel display 10 is a display that includes, inside its housing, a plurality of drive units that perform tactile presentation.

The first drive unit 21 is an actuator such as a piezoelectric element that is driven by application of a voltage. The first drive unit 21 is disposed inside the housing of the touch panel display 10. The first drive unit 21 is driven according to the voltage value indicated by the first drive signal.

The second drive unit 22 is an actuator such as a piezoelectric element that is driven by application of a voltage. The second drive unit 22 is disposed inside the housing of the touch panel display 10. The second drive unit 22 is driven according to the voltage value indicated by the second drive signal.

In addition, the control device 30 includes a central processing unit (CPU) 31, random access memory (RAM) 32, read only memory (ROM) 33, a storage unit 34, and an input/output interface 35. Individual units of the control device 30 are connected to each other by a bus 36.

The CPU 31 operates based on a program stored in the ROM 33 or the storage unit 34, and controls individual components. For example, the CPU 31 develops a program stored in the ROM 33 or the storage unit 34 to the RAM 32, and executes processes corresponding to various programs.

The ROM 33 stores a boot program such as a basic input output system (BIOS) executed by the CPU 31 at startup of the control device 30, programs that depend on the hardware of the control device 30, and the like.

The storage unit 34 is a nonvolatile storage medium such as a flash drive. The storage unit 34 is a non-transitory computer-readable recording medium that records a program executed by the CPU 31, data used by the program, and the like. Specifically, the storage unit 34 is a recording medium that records a control program according to the present disclosure, which is an example of program data 37.

The input/output interface 35 is an interface for connecting to the touch panel display 10, the first drive unit 21, and the second drive unit 22.

[Functional Configuration of Control Device 30 According to First Embodiment]

Figure 8:
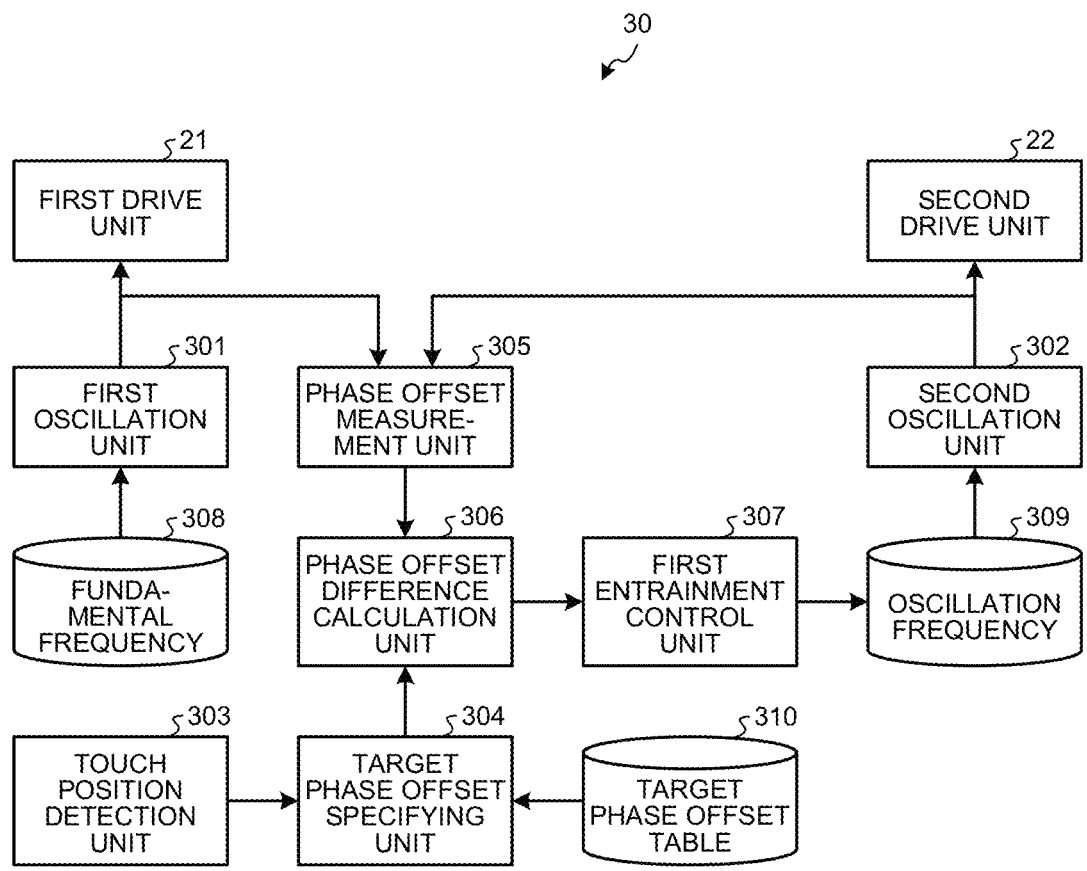
FIG. 8 is a block diagram illustrating an example of a functional configuration of a control device according to the first embodiment of the present disclosure.

Next, a functional configuration of the control device 30 according to the first embodiment will be described. FIG. 8 is a block diagram illustrating an example of a functional configuration of the control device 30 according to the first embodiment of the present disclosure. The CPU 31 executes various programs stored in the storage unit 34 or the like using the RAM 32 or the like as a work area, and actualizes various functions illustrated in FIG. 8 by this execution. Note that the various functions illustrated in FIG. 8 may be actualized by an integrated circuit such as an application specific integrated circuit (ASIC) or a field programmable gate array (FPGA). In addition, some or all of the various functions illustrated in FIG. 8 may be actualized by a dedicated hardware circuit. Further, various functions illustrated in FIG. 8 may be actualized by a cooperation of hardware and software.

The control device 30 includes a first oscillation unit 301, a second oscillation unit 302, a touch position detection unit 303, a target phase offset specifying unit 304, a phase offset measurement unit 305, a phase offset difference calculation unit 306, a first entrainment control unit 307, a fundamental frequency 308, an oscillation frequency 309, and a target phase offset table 310.

The first oscillation unit 301 applies a first drive signal, which is a signal oscillated with a numerical value indicated by the fundamental frequency 308, to the first drive unit 21. The fundamental frequency 308 is a preset frequency.

The second oscillation unit 302 applies a second drive signal, which is a signal oscillated at the numerical value indicated by the oscillation frequency 309, to the second drive unit 22. The oscillation frequency 309 is a frequency set by the first entrainment control unit 307.

Figure 9:
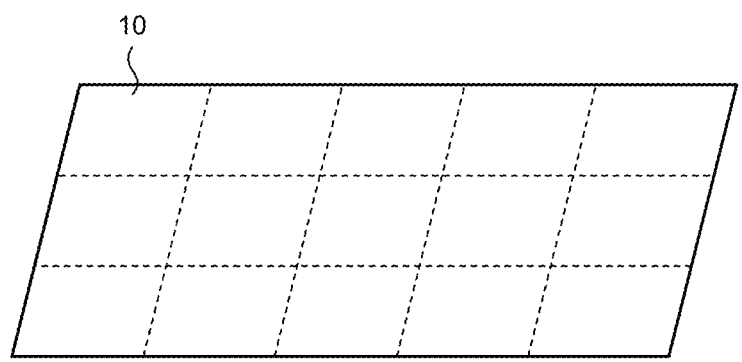
FIG. 9 is a view illustrating an example of division of a region of the touch panel display.

The touch position detection unit 303 is an example of a detection unit. The touch position detection unit 303 detects a contact position on the touch panel display 10 provided with a plurality of drive units that perform tactile presentation. Furthermore, the touch position detection unit 303 determines which region on the touch panel display 10 the contact position, that is, the touch position belongs to. Here, FIG. 9 is a diagram illustrating an example of division of the region of the touch panel display 10. As illustrated in FIG. 9, the touch panel display 10 is divided into a plurality of regions. The touch position detection unit 303 determines which region the contact position, which is the position that the user has come in contact with, belongs to. Although FIG. 9 illustrates an example of division into 15 regions, the number of regions may be 15 or more or less than 15. Each of the regions is not limited to a rectangular shape, and may have another shape.

The target phase offset specifying unit 304 specifies a target phase offset, which is a phase offset being an acquisition target of a plurality of drive signals each of which drives each of the plurality of drive units, based on the contact position detected by the touch position detection unit 303. More specifically, the target phase offset specifying unit 304 specifies the target phase offset that has been set in the region to which the contact position detected by the touch position detection unit 303 belongs, based on the target phase offset table 310 in which the target phase offset is set for each of the plurality of regions of the touch panel display 10.

The target phase offset table 310 represents target phase offset information that stores a phase offset for performing tactile presentation, that is, a phase offset between the first drive signal and the second drive signal for each of regions on the touch panel display 10. More specifically, the target phase offset specifying unit 304 extracts, from the target phase offset table 310, the target phase offset that has been set for the region to which the contact position detected by the touch position detection unit 303 belongs. In this manner, the target phase offset specifying unit 304 specifies the target phase offset corresponding to the contact position.

The phase offset measurement unit 305 is an example of a measurement unit. The phase offset measurement unit 305 measures a phase offset of the plurality of drive signals. That is, the phase offset measurement unit 305 measures a phase offset between the first drive signal output to the first drive unit 21 and the second drive signal output to the second drive unit 22.

The phase offset difference calculation unit 306 calculates a difference value indicating a difference between the current phase offset measured by the phase offset measurement unit 305 and the target phase offset specified by the target phase offset specifying unit 304.

The first entrainment control unit 307 is an example of a phase offset control unit. The first entrainment control unit 307 entrains the frequency of the second drive signal so that the phase between the first drive signal and the second drive signal has the target phase offset. That is, the first entrainment control unit 307 adjusts the phase offset of the plurality of drive signals so as to obtain the target phase offset specified by the target phase offset specifying unit 304. Furthermore, the first entrainment control unit 307 adjusts the phase offset of the plurality of drive signals stepwise until the target phase offset is obtained. For example, by changing the oscillation frequency 309 to be the frequency of the second drive signal, the first entrainment control unit 307 sets the phase offset of the plurality of drive signals to the target phase offset. That is, the first entrainment control unit 307 changes the oscillation frequency 309 stepwise and sets the phase offset of the plurality of drive signals to the target phase offset by this change.

The first entrainment control unit 307 sets the phase offset of the plurality of drive signals to the target phase offset based on the target phase offset specified by the target phase offset specifying unit 304 and the phase offset measured by the phase offset measurement unit 305. Here, the phase offset difference calculation unit 306 calculates a difference value indicating a difference between the phase offset measured by the phase offset measurement unit 305 and the target phase offset. Accordingly, the first entrainment control unit 307 adjusts the oscillation frequency 309 stepwise based on the difference value calculated by the phase offset difference calculation unit 306. That is, the first entrainment control unit 307 adjusts the oscillation frequency 309 within a range up to a predetermined upper limit value and sets the phase offset of the plurality of drive signals to the target phase offset by this adjustment.

For example, when the difference value calculated by the phase offset difference calculation unit 306 is a positive number, it indicates that the phase offset has not reached the target phase offset, and thus the first entrainment control unit 307 raises the oscillation frequency 309. In contrast, when the difference value calculated by the phase offset difference calculation unit 306 is a negative value, it indicates that the phase offset exceeds the target phase offset, and thus the first entrainment control unit 307 lowers the oscillation frequency 309.

In addition, when raising the oscillation frequency 309, the first entrainment control unit 307 raises the oscillation frequency 309 by the rate of a preset set value, for example. Similarly, when lowering the oscillation frequency 309, the first entrainment control unit 307 lowers the oscillation frequency 309 by the rate of a preset set value, for example. Here, the set value is a value at which the waveform of the second drive signal would not change abruptly, and is a value at which the second drive unit 22 can follow without generating abnormal noise. The set value is determined by the specification of second drive unit 22, the weight of touch panel display 10, and the like.

In addition, the first entrainment control unit 307 sometimes lowers the oscillation frequency 309 even when the difference value calculated by the phase offset difference calculation unit 306 is a positive number. For example, in a case where the oscillation frequency 309 is expected to exceed the fundamental frequency 308 in a decreasing process of the difference value, the first entrainment control unit 307 might lower the oscillation frequency 309. In this case, the first entrainment control unit 307 lowers the oscillation frequency 309 to the value higher than the fundamental frequency 308.

Here, the second oscillation unit 302 outputs the second drive signal, which is a signal oscillated at the numerical value indicated by the oscillation frequency 309, to the second drive unit 22. Accordingly, by adjusting the oscillation frequency 309, the first entrainment control unit 307 can set the phase offset of the plurality of drive signals including the first drive signal and the second drive signal to the target phase offset.

In addition, even when the touch position detection unit 303 no longer detects the contact position, the first entrainment control unit 307 adjusts the phase offset of the plurality of drive signals including the first drive signal and the second drive signal so as to obtain the target phase offset. That is, the first entrainment control unit 307 continues the adjustment of the oscillation frequency 309 so as to obtain the target phase offset. With this operation, the first entrainment control unit 307 can prevent an abrupt change in the frequency of the first drive signal and the frequency of the second drive signal. That is, the first entrainment control unit 307 can prevent generation of abnormal noise and the like.

The control device 30 repeatedly executes the measurement of the phase offset by the phase offset measurement unit 305, the calculation of the difference value of the phase offset by the phase offset difference calculation unit 306 and the setting of the oscillation frequency 309 by the first entrainment control unit 307, and obtains the phase offset specified by the target phase offset specifying unit 304 by the repeated execution. In this manner, the control device 30 adjusts the oscillation frequency 309 stepwise by repeatedly executing the control. Accordingly, since the waveform of the second drive signal does not change abruptly, the control device 30 can prevent an occurrence of abnormal noise and a failure in the second drive unit 22 to follow.

[Phase Offset Adjustment Process According to First Embodiment]

Figure 10:
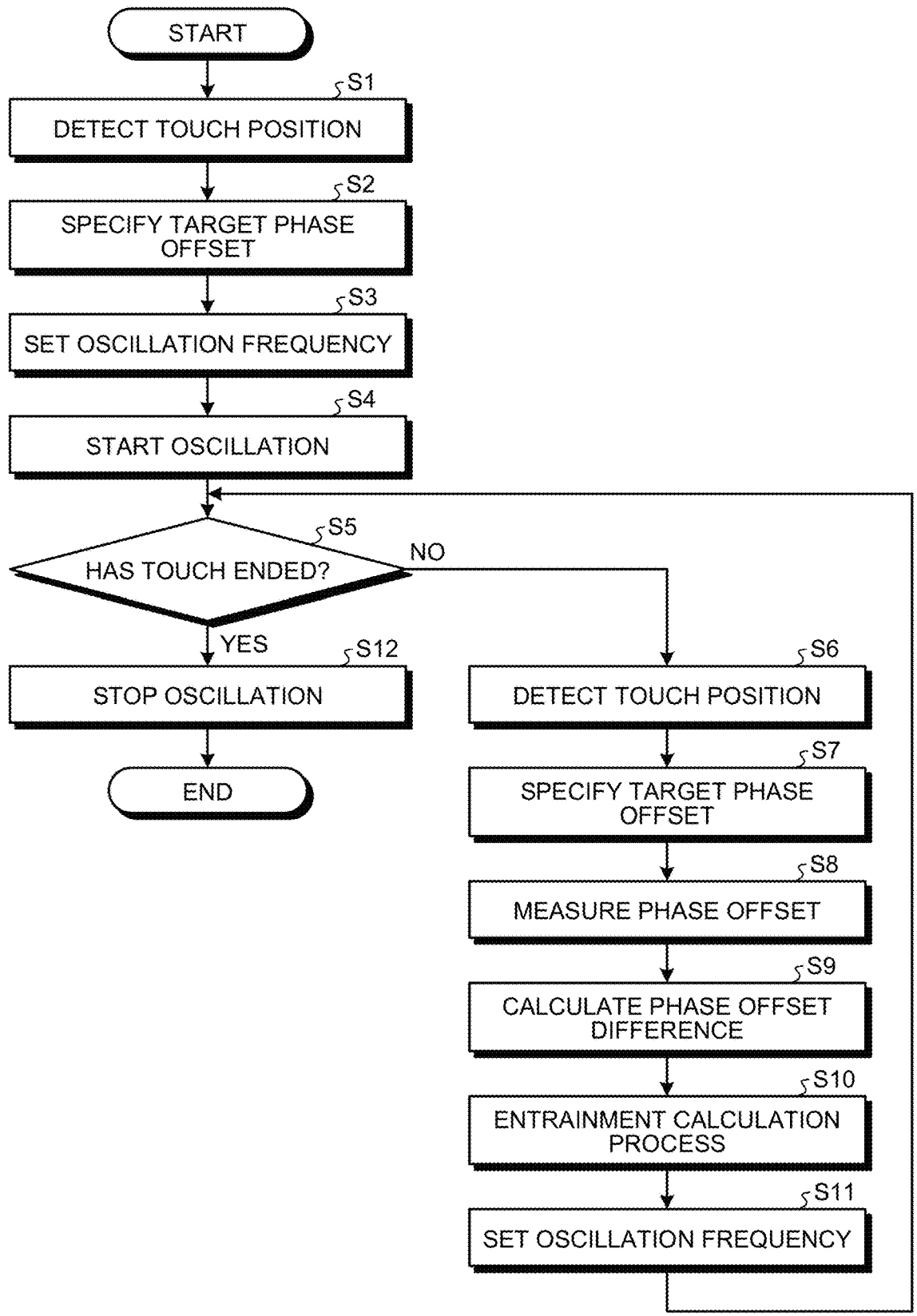
FIG. 10 is a flowchart illustrating an example of a phase offset adjustment process executed by the control device according to the first embodiment of the present disclosure.

Next, a phase offset adjustment process executed by the control device 30 according to the first embodiment will be described. The phase offset adjustment process is a process of adjusting the second drive signal so as to obtain the target phase offset corresponding to the user touch position. FIG. 10 is a flowchart illustrating an example of a phase offset adjustment process executed by the control device 30 according to the first embodiment of the present disclosure.

The touch position detection unit 303 detects a user touch position on the touch panel display 10 (Step S1).

The target phase offset specifying unit 304 extracts, from the target phase offset table 310, the target phase offset corresponding to the touch position detected by the touch position detection unit 303 (Step S2).

The first entrainment control unit 307 sets the oscillation frequency 309 (Step S3). For example, the first entrainment control unit 307 sets the same frequency as the fundamental frequency 308, as the oscillation frequency 309.

The first oscillation unit 301 and the second oscillation unit 302 start oscillation (Step S4). That is, the first oscillation unit 301 outputs the first drive signal oscillated at the fundamental frequency 308 to the first drive unit 21. In addition, the second oscillation unit 302 outputs the second drive signal oscillated at the oscillation frequency 309 to the second drive unit 22.

The touch position detection unit 303 determines whether the user's touch on the touch panel display 10 has ended (Step S5). That is, the touch position detection unit 303 determines whether the user's touch can be detected from the touch panel display 10.

When the touch has not ended (Step S5; No), the touch position detection unit 303 detects the user touch position on the touch panel display 10 (Step S6).

The target phase offset specifying unit 304 extracts, from the target phase offset table 310, the target phase offset corresponding to the touch position detected by the touch position detection unit 303 (Step S7).

The phase offset measurement unit 305 measures a phase offset between the first drive signal output to the first drive unit 21 and the second drive signal output to the second drive unit 22 (Step S8).

The phase offset difference calculation unit 306 calculates a difference value indicating a difference between the current phase offset measured by the phase offset measurement unit 305 and the target phase offset specified by the target phase offset specifying unit 304 (Step S9).

The first entrainment control unit 307 executes an entrainment calculation process (Step S10). That is, the first entrainment control unit 307 determines whether to increase or decrease the oscillation frequency 309 based on the difference value calculated by the phase offset difference calculation unit 306. In addition, the first entrainment control unit 307 determines a frequency to be set as the oscillation frequency 309.

The first entrainment control unit 307 sets the oscillation frequency 309 (Step S11). Subsequently, the control device 30 proceeds to Step S5.

When the user's touch ends in Step S5 (Step S5; Yes), the first oscillation unit 301 and the second oscillation unit 302 end the oscillation (Step S12).

With the above process, the control device 30 ends the phase offset adjustment process.

[Method for Setting Target Phase Offset Table 310 According to First Embodiment]

Figure 11:
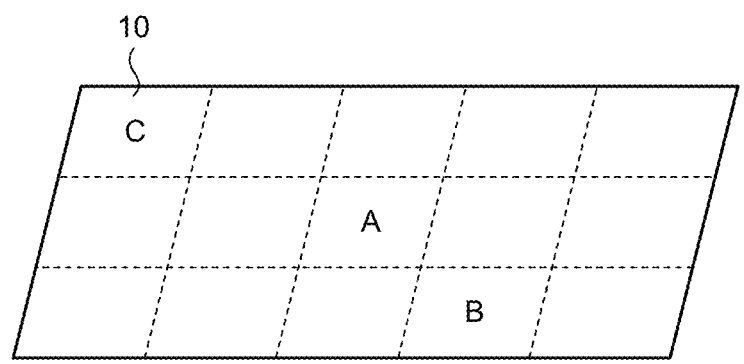
FIG. 11 is a view illustrating an example of measurement positions.
Figure 12:
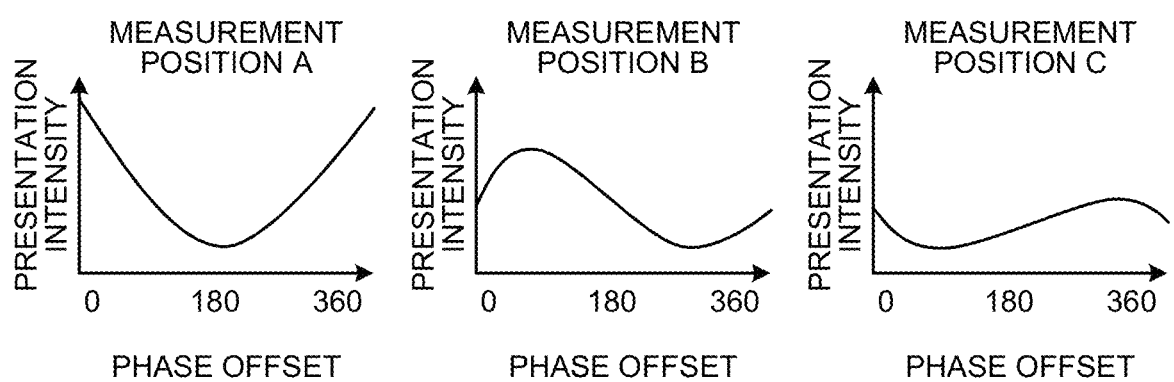
FIG. 12 is a diagram illustrating an example of measurement results for individual measurement positions.

Here, FIG. 11 is a diagram illustrating an example of measurement positions. FIG. 12 is a diagram illustrating an example of a measurement result for each of measurement positions. FIG. 11 includes a measurement position A, a measurement position B, and a measurement position C as examples of measurement positions in a case where the touch panel display 10 is divided into individual regions. In addition, FIG. 12 includes a graph illustrating the presentation intensity for each of phase offsets for each of the measurement position A, the measurement position B, and the measurement position C.

As illustrated in FIGS. 11 and 12, the presentation intensity for each of phase offsets is measured for each of the measurement positions. Subsequently, the phase offset of the most desirable presentation intensity among the presentation intensities for each of phase offsets is set in the target phase offset table 310 as the target phase offset of the region to which the measurement position belongs. Here, the most desirable presentation intensity is selected in accordance with the use of tactile presentation. For example, when it is desired to more distinctly perform tactile presentation, the highest presentation intensity is selected; and when it is desired to perform uniform tactile presentation in each of regions on the touch panel display 10, a substantially uniform presentation intensity is selected for each of measurement positions.

As described above, according to the control device 30 of the first embodiment, the touch position detection unit 303 detects the user touch position. In addition, the target phase offset specifying unit 304 specifies the target phase offset corresponding to the user touch position based on the target phase offset table 310 in which the target phase offset is set for each of regions on the touch panel display 10. The first entrainment control unit 307 compares the measurement result of the phase offset of the signals that drive the first drive unit 21 and the second drive unit 22 with the target phase offset, and adjusts the oscillation frequency 309 within a range of the upper limit value to set the phase offset of the drive signal to the target phase offset. By setting the target phase offset, the control device 30 can suppress occurrence of a region where tactile presentation fails due to interference between vibrations of the first drive unit 21 and the second drive unit 22.

Therefore, the control device 30 can reproduce tactile presentation with a uniform tactile intensity regardless of the user contact position. In addition, the control device 30 adjusts the oscillation frequency 309 stepwise within the range of the upper limit value so as to obtain the target phase offset. Therefore, the control device 30 does not abruptly change the phase of the drive signal, making it possible to prevent the first drive unit 21 and the second drive unit 22 from generating abnormal noise or prevent their failure to follow the change in the drive signal. Furthermore, the control device 30 is feedback control of adjusting the oscillation frequency 309 when the phase offset is not the target phase offset, making it possible to easily set the phase offset between the first drive signal and the second drive signal to the target phase offset without requiring high machine power.

First Modification of First Embodiment

In the first embodiment, the control device 30 adjusts the oscillation frequency 309 by using the first entrainment control unit 307. By adjusting the oscillation frequency 309, the control device 30 generates a phase offset between the first drive signal to be output to the first drive unit 21 and the second drive signal to be output to the second drive unit 22. A control device 30a according to a first modification uses a frequency selection unit 311 to generate a phase offset.

Figure 13:
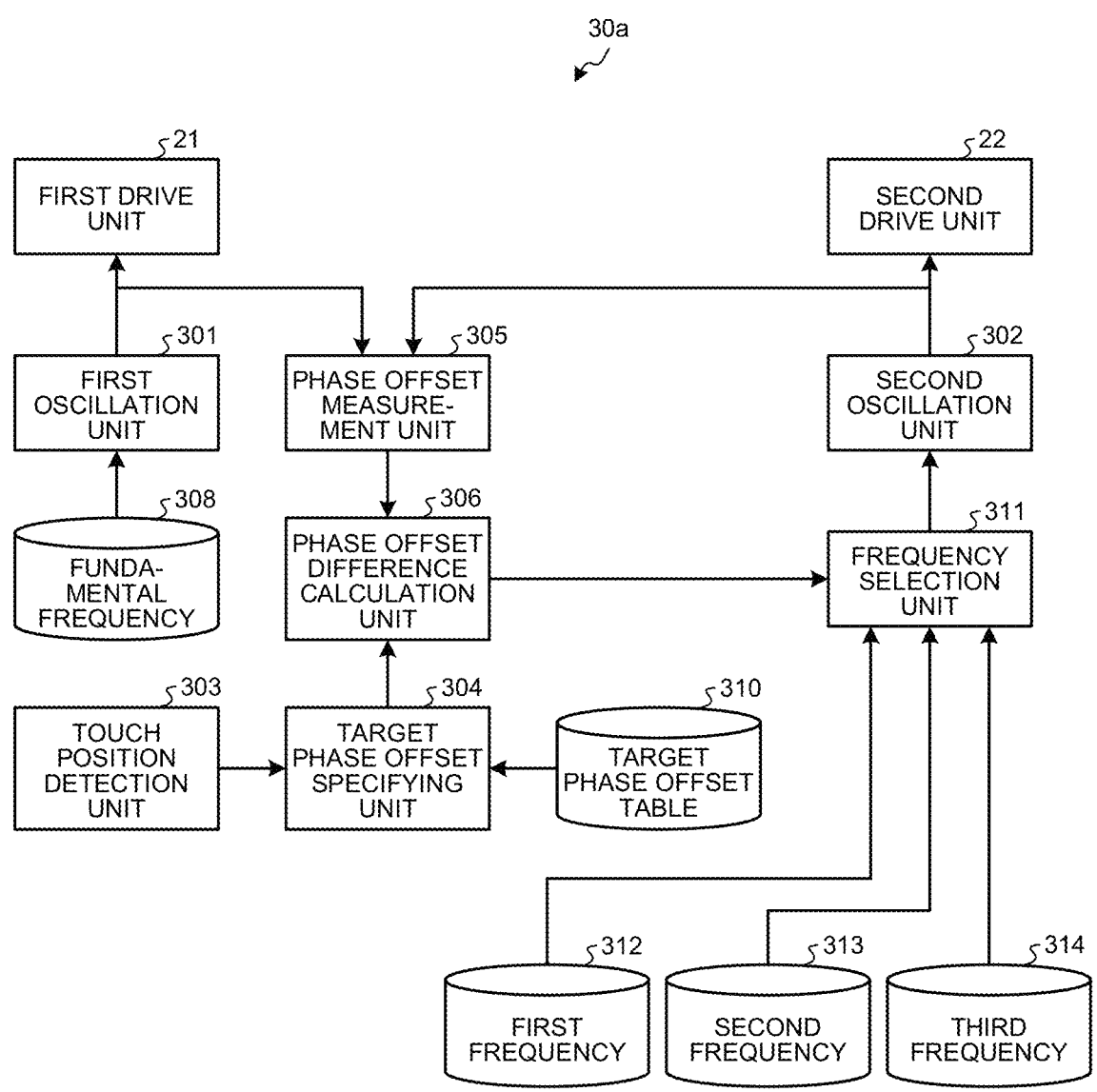
FIG. 13 is a diagram illustrating an example of a functional configuration of a control device according to a first modification of the present disclosure.

Here, FIG. 13 is a diagram illustrating an example of a functional configuration of the control device 30a according to the first modification of the present disclosure. The control device 30a includes the frequency selection unit 311 instead of the first entrainment control unit 307. The control device 30a has a first frequency 312, a second frequency 313, and a third frequency 314.

The frequency selection unit 311 is an example of a phase offset control unit in the first modification. The frequency selection unit 311 selects one frequency from among the plurality of frequencies based on the phase offset of the plurality of drive signals and the target phase offset, and sets the phase offset of the plurality of drive signals including the first drive signal and the second drive signal to the target phase offset, by this selection. More specifically, the frequency selection unit 311 selects one frequency from among the first frequency 312, the second frequency 313, or the third frequency 314. The first frequency 312 is, for example, substantially the same frequency as the fundamental frequency 308. The second frequency 313 is, for example, a frequency 12.5 percent higher than the fundamental frequency 308. The third frequency 314 is, for example, a frequency 12.5 percent lower than the fundamental frequency 308. Note that the numerical values of 12.5 percent for the second frequency 313 and the third frequency 314 are an example, and can be set to any value. Note that the values of the second frequency 313 and the third frequency 314 are preferably values that would not cause an abrupt change in the waveform of the second drive signal, and are preferably values at which the second drive unit 22 can follow without generating abnormal noise.

The frequency selection unit 311 selects the second frequency 313 when the difference value of the phase offsets calculated by the phase offset difference calculation unit 306 is higher than a first threshold. In addition, the frequency selection unit 311 selects the third frequency 314 when the difference value of the phase offsets calculated by the phase offset difference calculation unit 306 is lower than a second threshold value. The frequency selection unit 311 selects the first frequency 312 when the difference value of the phase offsets calculated by the phase offset difference calculation unit 306 is lower than the first threshold and higher than the second threshold.

In the above description, the frequency selection unit 311 selects the frequency of the second drive signal to be output to the second oscillation unit 302 from among three frequencies. However, the number of frequencies is not limited to three, and the frequency selection unit 311 may select the frequency of the second drive signal to be output to the second oscillation unit 302 from among frequencies of an arbitrary number.

As described above, according to the control device 30a of the first modification of the first embodiment, the frequency selection unit 311 compares the measurement result of the phase offset of the signals that drive the first drive unit 21 and the second drive unit 22 with the target phase offset, and then selects the frequency of the second drive signal from among the first frequency 312, the second frequency 313, or the third frequency 314. With this operation, the frequency selection unit 311 sets the phase offset between the first drive signal and the second drive signal to the target phase offset. Accordingly, the control device 30a can suppress occurrence of a region where tactile presentation fails due to interference between vibrations of the first drive unit 21 and the second drive unit 22. Consequently, the control device 30a can reproduce tactile presentation with a uniform tactile intensity regardless of the user contact position.

Second Modification of First Embodiment

Figure 14:
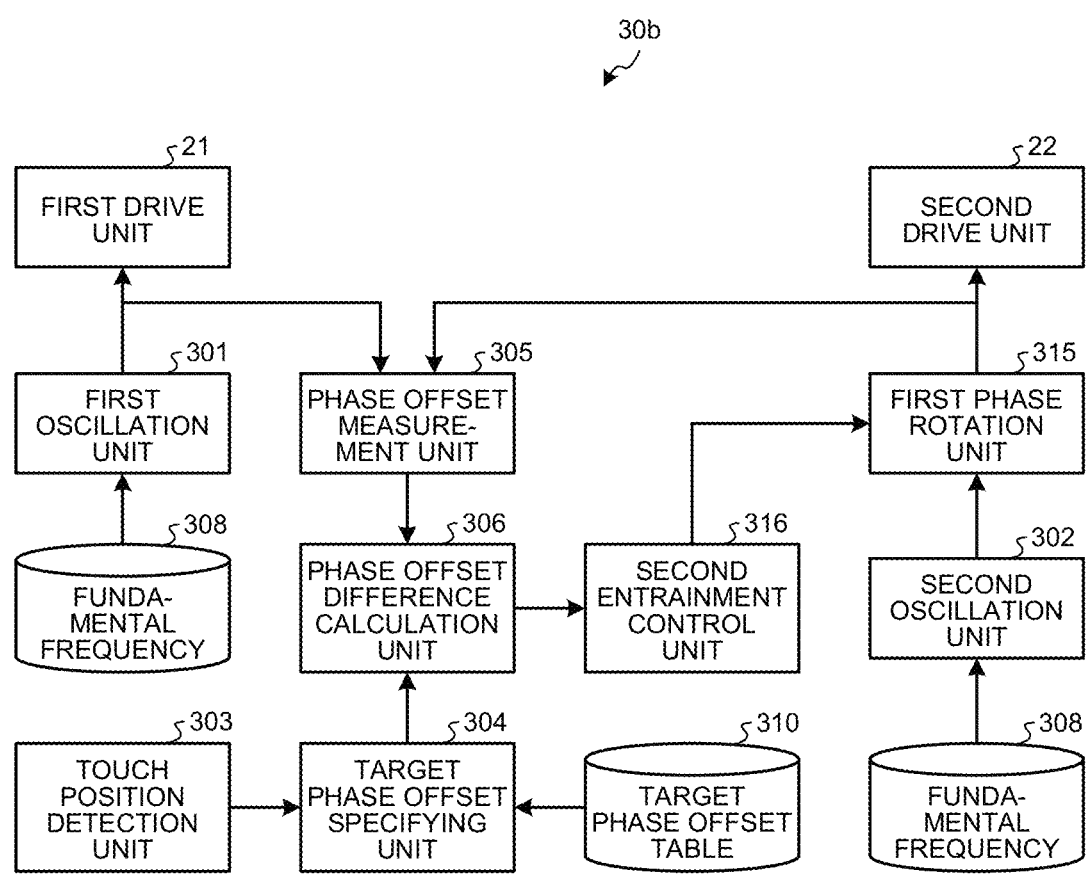
FIG. 14 is a diagram illustrating an example of a functional configuration of a control device according to a second modification of the present disclosure.

A control device 30b according to a second modification generates a phase offset by shifting the phase by using a first phase rotation unit 315. Here, FIG. 14 is a diagram illustrating an example of a functional configuration of the control device 30b according to the second modification of the present disclosure.

A second entrainment control unit 316 is an example of a phase control unit according to the second modification. The second entrainment control unit 316 controls a rotation amount by which the phase of the drive signal is to be rotated and sets the phase offset of the plurality of drive signals to the target phase offset by this control. More specifically, based on a difference value calculated by the phase offset difference calculation unit 306, the second entrainment control unit 316 calculates the rotation amount of the phase of the second drive signal by which the phase offset between the first drive signal and the second drive signal is set to the target phase offset.

In addition, the second entrainment control unit 316 sets an absolute value of the rotation amount of the phase to be less than the upper limit value. In a case where the phase offset of the target phase offset specified by the target phase offset specifying unit 304 is not obtained by one phase rotation due to the upper limit value, the second entrainment control unit 316 executes the phase rotation a plurality of times to obtain the phase offset indicated by the target phase offset specified by the target phase offset specifying unit 304. Incidentally, the upper limit value is determined by the specifications of second drive unit 22, the weight of touch panel display 10 vibrated by second drive unit 22, and the like. In this manner, the second entrainment control unit 316 executes the phase rotation a plurality of times and obtains the target phase offset, making it possible to prevent issues such as the occurrence of abnormal noise and the failure in the second drive unit 22 to follow by this execution.

The second oscillation unit 302 outputs the signal oscillated at the fundamental frequency 308 to the first phase rotation unit 315.

The first phase rotation unit 315 rotates the phase of the signal output from the second oscillation unit 302 based on the rotation amount of the phase calculated by the second entrainment control unit 316.

As described above, according to the control device 30b of the second modification of the first embodiment, the second entrainment control unit 316 calculates the rotation amount of the phase of the signal oscillated by the second oscillation unit 302. In addition, based on the rotation amount calculated by the second entrainment control unit 316, the first phase rotation unit 315 rotates the phase of the signal oscillated by the second oscillation unit 302 and generates the second drive signal by this rotation. Subsequently, the first phase rotation unit 315 outputs the generated second drive signal to the second drive unit 22. In this manner, the second entrainment control unit 316 controls the rotation amount of the phase of the signal oscillated by the second oscillation unit 302, and sets the phase offset between the first drive signal and the second drive signal to the target phase offset by this control. Accordingly, the control device 30b can suppress occurrence of a region where tactile presentation fails due to interference between vibrations of the first drive unit 21 and the second drive unit 22. Consequently, the control device 30b can reproduce tactile presentation with a uniform tactile intensity regardless of the user contact position.

Third Modification of First Embodiment

Figure 15:
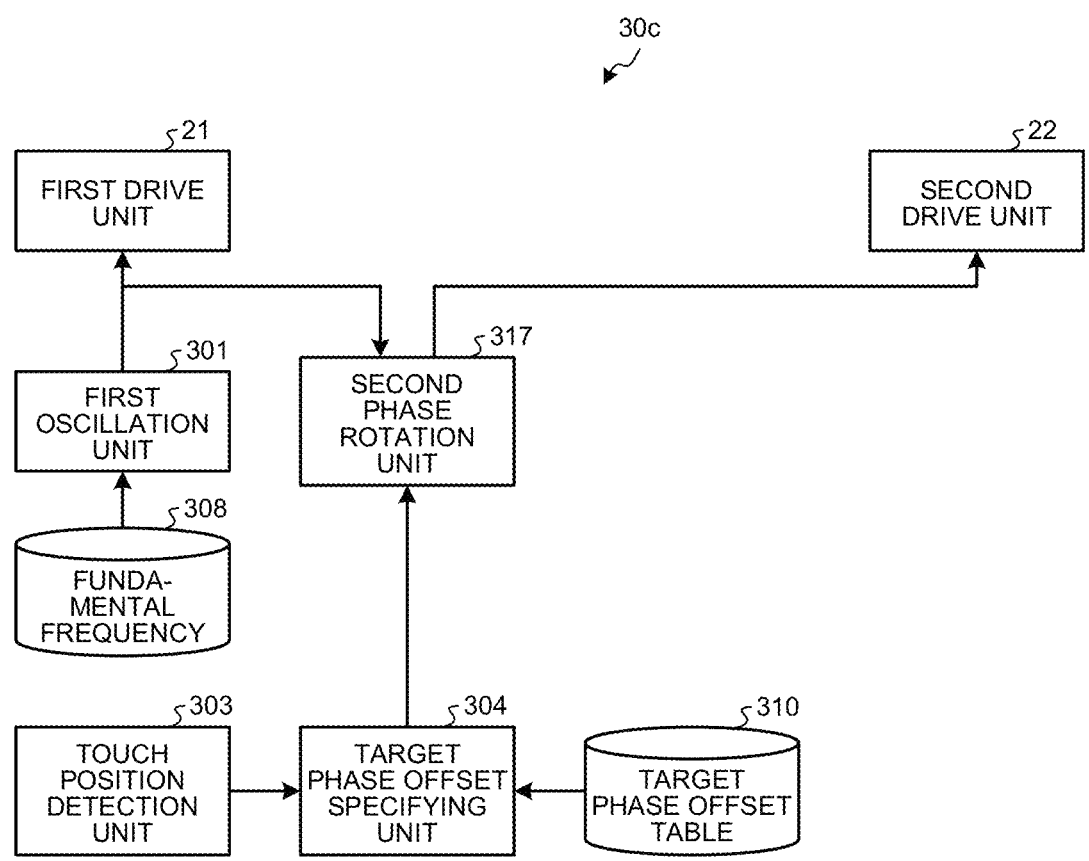
FIG. 15 is a diagram illustrating an example of a functional configuration of a control device according to a third modification of the present disclosure.

A control device 30c according to a third modification applies phase rotation on the first drive signal input to the first drive unit 21, and then inputs the processed first drive signal to the second drive unit 22. Here, FIG. 15 is a diagram illustrating an example of a functional configuration of the control device 30c according to the third modification of the present disclosure.

The control device 30c according to the third modification does not include the second oscillation unit 302 according to the first embodiment. Therefore, the control device 30c uses a second phase rotation unit 317 to rotate the phase of the signal oscillated by the first oscillation unit 301 and then inputs the processed signal to the second drive unit 22.

Based on the target phase offset table 310, the target phase offset specifying unit 304 specifies a target phase offset corresponding to the contact position detected by the touch position detection unit 303.

The second phase rotation unit 317 is an example of a phase control unit in the third modification. Based on the first drive signal output to the first drive unit 21, the second phase rotation unit 317 generates the second drive signal obtained by rotating the phase of the first drive signal and sets the phase offset of the plurality of drive signals to the target phase offset by this generating process. More specifically, the second phase rotation unit 317 rotates the phase of the second drive signal output to the second drive unit 22 based on the target phase offset specified by the target phase offset specifying unit 304. That is, the second phase rotation unit 317 adjusts the phase offset between the first drive signal input from the first oscillation unit 301 and the second drive signal to be output to the second drive unit 22 so as to obtain the target phase offset specified by the target phase offset specifying unit 304.

Here, the second phase rotation unit 317 rotates the phase stepwise so as to suppress rotation of an upper limit value or more. For example, the second phase rotation unit 317 rotates the phase so that the rotation amount per period would not exceed the upper limit value. Subsequently, the second phase rotation unit 317 rotates the phase in a plurality of periods and sets the phase offset between the first drive signal input from the first oscillation unit 301 and the second drive signal to be output to the second drive unit 22 to the target phase offset by this rotation.

As described above, according to the control device 30c of the third modification of the first embodiment, the second phase rotation unit 317 rotates the phase of the signal oscillated by the first oscillation unit 301 based on the target phase offset specified by the target phase offset specifying unit 304, and generates the second drive signal by this rotation. That is, the second phase rotation unit 317 generates the second drive signal such that the phase offset between the first drive signal and the second drive signal is set to the target phase offset. Accordingly, the control device 30c can suppress occurrence of a region where tactile presentation fails due to interference between vibrations of the first drive unit 21 and the second drive unit 22. Consequently, the control device 30c can reproduce tactile presentation with a uniform tactile intensity regardless of the user contact position.

Fourth Modification of First Embodiment

Figure 16:
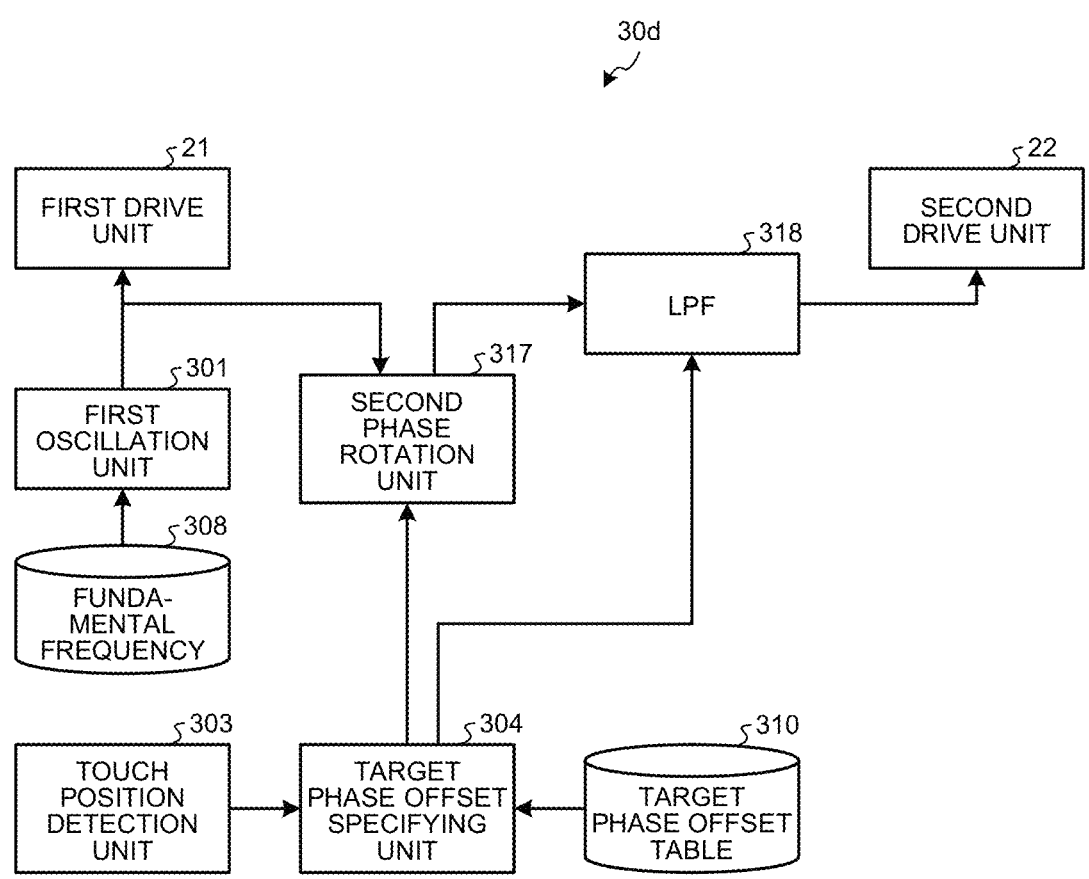
FIG. 16 is a diagram illustrating an example of a functional configuration of a control device according to a fourth modification of the present disclosure.

A control device 30d according to a fourth modification inputs the second drive signal to the second drive unit 22 via a low pass filter (LPF) 318. Here, FIG. 16 is a diagram illustrating an example of a functional configuration of the control device 30d according to the fourth modification of the present disclosure.

Based on the target phase offset table 310, the target phase offset specifying unit 304 specifies a target phase offset corresponding to the contact position detected by the touch position detection unit 303.

The second phase rotation unit 317 rotates the phase of the signal to be output to the second drive unit 22 based on the target phase offset specified by the target phase offset specifying unit 304. More specifically, the second phase rotation unit 317 outputs a signal obtained by rotating the phase of the first drive signal output from the first oscillation unit 301.

Here, the second phase rotation unit 317 rotates the phase stepwise so as to suppress rotation of an upper limit value or more. For example, the second phase rotation unit 317 rotates the phase so that the rotation amount per period would not exceed the upper limit value. Subsequently, the second phase rotation unit 317 rotates the phase in a plurality of periods and sets the phase offset between the first drive signal input from the first oscillation unit 301 and the second drive signal to be output to the second drive unit 22 to the target phase offset by this rotation.

The LPF 318 is an example of a removal unit. The LPF 318 removes a high frequency component of the second drive signal. More specifically, the LPF 318 removes a high frequency component from the signal rotated by the second phase rotation unit 317. In the rotation of the phase, the second phase rotation unit 317 might generate a high frequency as illustrated in the switching timing of FIG. 3, for example. When having an input of such a high frequency signal, the second drive unit 22 might fail to follow the high frequency signal or might generate abnormal noise. To handle this, the LPF 318 removes a high frequency component from the signal rotated by the second phase rotation unit 317. Subsequently, the LPF 318 outputs the signal from which the high frequency component has been removed to the second drive unit 22. Accordingly, the LPF 318 can prevent occurrence of a failure to follow a high frequency signal or generation of abnormal noise.

In addition, the LPF 318 receives a switching signal for switching whether or not to remove the high frequency component. Subsequently, the LPF 318 enables removal of the high frequency component based on the switching signal. Here, when the target phase offset specifying unit 304 has specified the target phase offset, the second phase rotation unit 317 rotates the phase. During the phase rotation, the waveform of the second drive signal becomes discontinuous, which causes generation of a high frequency. That is, the second phase rotation unit 317 outputs a high frequency when the target phase offset specifying unit 304 has specified the target phase offset. To handle this, the LPF 318 removes the high frequency component of the signal to be the basis of the second drive signal for a predetermined time period from the time of phase rotation of the first drive signal. In this manner, the LPF 318 enables the removal of the high frequency component for a predetermined time period from the time of the phase rotation of the first drive signal, making it possible to prevent occurrence of abnormal noise and the like. In addition, the LPF 318 can suppress the power consumption by disabling the removal of the high frequency component.

As described above, according to the control device 30d of the fourth modification of the first embodiment, the second phase rotation unit 317 rotates the phase of the signal oscillated by the first oscillation unit 301 based on the target phase offset specified by the target phase offset specifying unit 304, and generates the second drive signal by this rotation. That is, the second phase rotation unit 317 generates the second drive signal such that the phase offset between the first drive signal and the second drive signal is set to the target phase offset. Furthermore, the LPF 318 removes a high frequency component of the second drive signal. Accordingly, the control device 30d can suppress occurrence of a region where tactile presentation fails due to interference between vibrations of the first drive unit 21 and the second drive unit 22. Consequently, the control device 30d can reproduce tactile presentation with a uniform tactile intensity regardless of the user contact position. Furthermore, since the high frequency component is removed from the second drive signal, the control device 30d can prevent the occurrence of abnormal noise from the second drive unit 22 or occurrence of a failure in the second drive unit 22 to follow the change in the second drive signal.

Fifth Modification of First Embodiment

Figure 17:
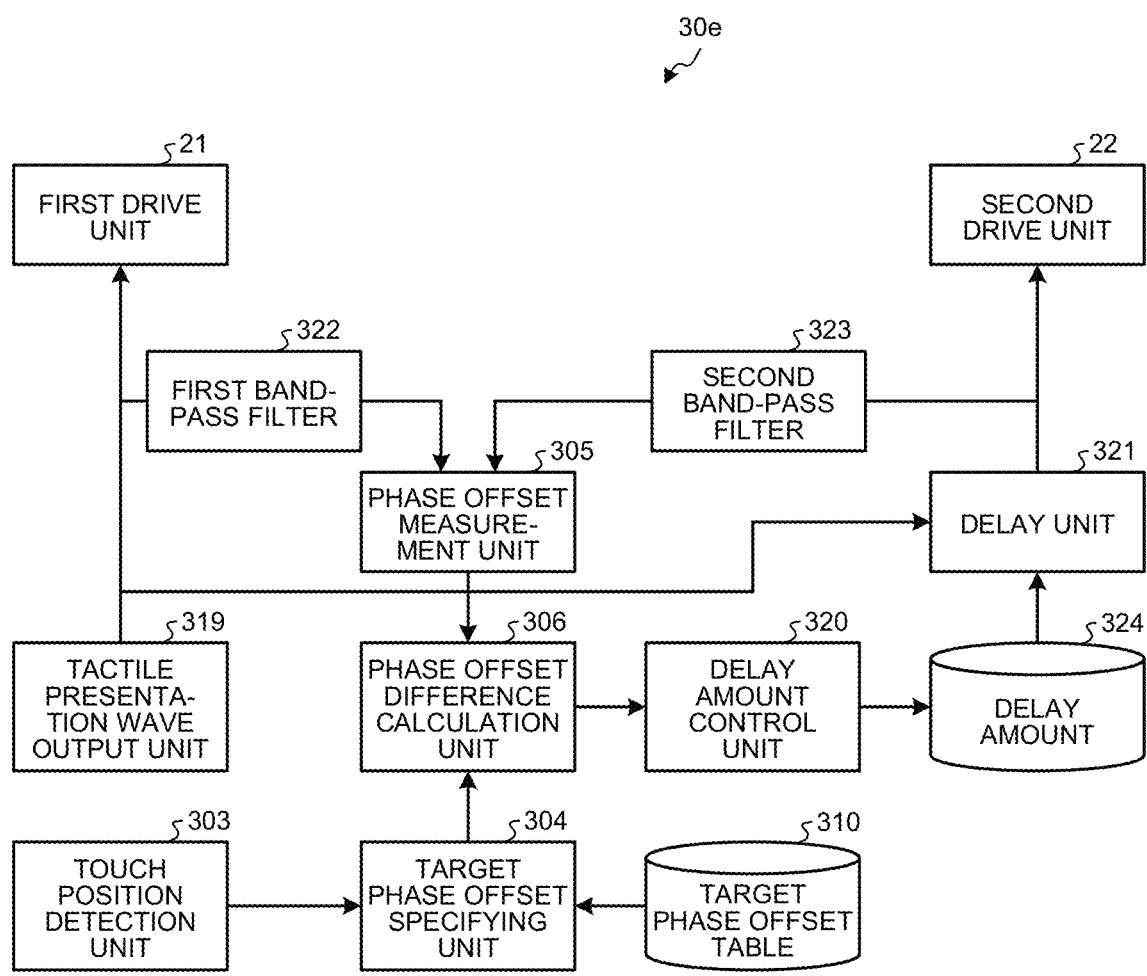
FIG. 17 is a diagram illustrating an example of a functional configuration of a control device according to a fifth modification of the present disclosure.

A control device 30e according to a fifth modification inputs a tactile presentation wave output unit 319 to the first drive unit 21 and the second drive unit 22, instead of the sine wave. Here, FIG. 17 is a diagram illustrating an example of a functional configuration of the control device 30e according to the fifth modification of the present disclosure.

The control device 30e according to the fifth modification includes the tactile presentation wave output unit 319 instead of the first oscillation unit 301 and the second oscillation unit 302 according to the first embodiment. In addition, the control device 30e includes a delay amount control unit 320 instead of the first entrainment control unit 307 according to the first embodiment. The control device 30e further includes a delay unit 321, a first band-pass filter 322, a second band-pass filter 323, and a delay amount 324.

The tactile presentation wave output unit 319 outputs a signal having a tactile presentation waveform. The tactile presentation waveform is a waveform that reproduces tactile presentation desired to be experienced by the user. Each of the plurality of drive signals including the first drive signal and the second drive signal is a tactile presentation waveform indicating a waveform that reproduces tactile presentation.

The first drive unit 21 and the second drive unit 22 are driven in accordance with the waveforms of the first drive signal and the second drive signal, respectively. That is, the first drive unit 21 and the second drive unit 22 reproduce tactile presentation corresponding to the waveforms of the first drive signal and the second drive signal, respectively. Accordingly, the tactile presentation wave output unit 319 outputs the signal having a tactile presentation waveform, making it possible to reproduce tactile presentation desired to be experienced by the user. Note that the tactile presentation wave output unit 319 outputs a tactile presentation waveform in a band passed by the first band-pass filter 322 and the second band-pass filter 323.

The first band-pass filter 322 and the second band-pass filter 323 are examples of an extraction unit. The first band-pass filter 322 and the second band-pass filter 323 extract a predetermined band from each of a plurality of drive signals having a tactile presentation waveform. More specifically, the first band-pass filter 322 outputs a signal in a preset band among the first drive signals output from the tactile presentation wave output unit 319 to the phase offset measurement unit 305. The second band-pass filter 323 outputs a signal in a preset band among the second drive signals output from the delay unit 321 to the phase offset measurement unit 305.

The phase offset measurement unit 305 outputs a difference value indicating a phase offset between the signal output from the first band-pass filter 322 and the signal output from the second band-pass filter 323.

The delay amount control unit 320 is an example of a phase offset control unit in the fifth modification. The delay amount control unit 320 controls a delay amount by which any of the plurality of drive signals including the first drive signal and the second drive signal is to be delayed, and sets the phase offset of the plurality of drive signals to the target phase offset by this control. More specifically, based on the difference value calculated by the phase offset difference calculation unit 306, the delay amount control unit 320 adjusts the delay amount 324 of the signal to be output to the second drive unit 22. That is, the delay amount control unit 320 sets the phase offset of the plurality of drive signals including the first drive signal and the second drive signal in the band extracted by the first band-pass filter 322 and the second band-pass filter 323, to the target phase offset.

For example, when the difference value calculated by the phase offset difference calculation unit 306 is a positive number, it indicates that the phase offset has not reached the target phase offset, and thus the delay amount control unit 320 increases the delay amount 324. In contrast, when the difference value calculated by the phase offset difference calculation unit 306 is a negative value, it indicates that the phase offset exceeds the target phase offset, and thus the delay amount control unit 320 decreases the delay amount 324.

In some cases, the delay amount control unit 320 decreases the delay amount 324 even when the difference value calculated by the phase offset difference calculation unit 306 is a positive number. For example, in a case where the phase offset is expected to exceed the target phase offset in a decreasing process of the difference value, the delay amount control unit 320 decreases the delay amount 324.

The delay unit 321 delays the first drive signal output from the tactile presentation wave output unit 319 by a numerical value indicated by the delay amount 324. Subsequently, the delay unit 321 outputs a second drive signal obtained by delaying the first drive signal by the numerical value indicated by the delay amount 324, to the second drive unit 22.

As described above, according to the control device 30e of the fifth modification of the first embodiment, the delay amount control unit 320 calculates the delay amount 324 by which the first drive signal having the tactile presentation waveform is to be delayed. The delay unit 321 delays the first drive signal by the delay amount 324 calculated by the delay amount control unit 320 and generates a second drive signal by this delaying operation. With this operation, the delay unit 321 sets the phase offset between the first drive signal and the second drive signal to the target phase offset. Accordingly, the control device 30e can suppress occurrence of a region where tactile presentation fails due to interference between vibrations of the first drive unit 21 and the second drive unit 22. That is, the control device 30e can reproduce tactile presentation with a uniform tactile intensity regardless of the user contact position.

Sixth Modification of First Embodiment

Figure 18:
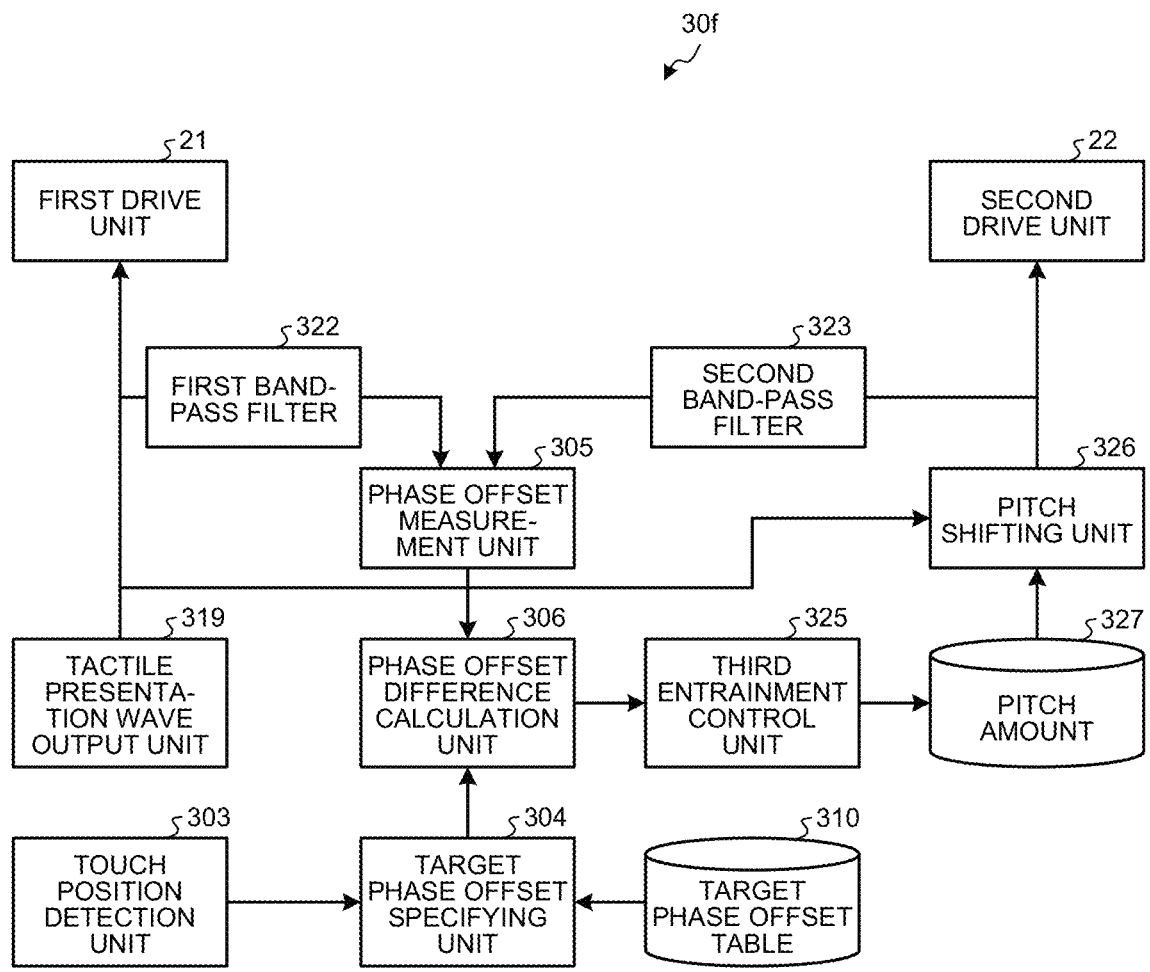
FIG. 18 is a diagram illustrating an example of a functional configuration of a control device according to a sixth modification of the present disclosure.

A control device 30f according to a sixth modification controls the phase offset between the first drive signal and the second drive signal by changing the pitch of the second drive signal. Here, FIG. 18 is a diagram illustrating an example of a functional configuration of the control device 30f according to the sixth modification of the present disclosure.

The control device 30f according to the sixth modification includes a third entrainment control unit 325 instead of the delay amount control unit 320 of the fifth modification. In addition, the control device 30f includes a pitch shifting unit 326 instead of the delay unit 321 of the fifth modification. The control device 30f includes a pitch amount 327.

The third entrainment control unit 325 is an example of a phase offset control unit in the sixth modification. The third entrainment control unit 325 controls a pitch amount of any drive signal out of the plurality of drive signals including the first drive signal and the second drive signal, and sets the phase offset of the plurality of drive signals to the target phase offset by this control. More specifically, based on the difference value calculated by the phase offset difference calculation unit 306, the third entrainment control unit 325 adjusts the pitch amount 327 of the second drive signal to be output to the second drive unit 22. That is, the third entrainment control unit 325 adjusts the frequency of the tactile presentation wave, that is, the length of the waveform of the tactile presentation wave. In a case where the tactile presentation wave includes a plurality of frequencies, the third entrainment control unit 325 changes the pitch amount 327 in each of the frequencies with an equal ratio. For example, when the difference value calculated by the phase offset difference calculation unit 306 is a positive number, it indicates that the phase offset has not reached the target phase offset, and thus, the third entrainment control unit 325 increases the pitch amount 327. In contrast, when the difference value calculated by the phase offset difference calculation unit 306 is a negative number, it indicates that the phase offset has not reached the target phase offset, and thus the third entrainment control unit 325 decreases the pitch amount 327.

In some cases, the third entrainment control unit 325 decreases the pitch amount 327 even when the difference value calculated by the phase offset difference calculation unit 306 is a positive number. For example, in a case where the difference value is expected to be a negative number in a decreasing process of the difference value, the third entrainment control unit 325 decreases the pitch amount 327. In this case, the third entrainment control unit 325 increases the pitch amount 327 in a case where the difference value is expected to be a negative number in a decreasing process of the difference value.

Based on the pitch amount 327, the pitch shifting unit 326 shifts the pitch of the first drive signal output from the tactile presentation wave output unit 319. That is, the pitch shifting unit 326 adjusts the length of the waveform of the tactile presentation wave of the first drive signal based on the pitch amount 327. Subsequently, the pitch shifting unit 326 outputs the tactile presentation wave with the adjusted waveform length to the second drive unit 22. That is, the pitch shifting unit 326 outputs the second drive signal to the second drive unit 22. More specifically, the pitch shifting unit 326 samples the first drive signal output from the tactile presentation wave output unit 319 at the pitch indicated by the pitch amount 327. Next, the pitch shifting unit 326 outputs the second drive signal generated based on the sampled information to the second drive unit 22. Here, in a case where, after entrainment has been stabilized, the pitch shifting unit 326 generates the second drive signal at the same rate as the sampling rate used in the sampling at the pitch indicated by the pitch amount 327, the pitch shifting unit would generate the second drive signal having the same input value as the first drive signal. To handle this, for the purpose of holding the entrainment state, the pitch shifting unit 326 generates the second drive signal by reversely shifting the once pitch-shifted signal at the same rate as the pitch at which the tactile presentation wave output unit 319 has generated the first drive signal. In this manner, the pitch shifting unit 326 outputs the tactile presentation wave having the adjusted waveform length to the second drive unit 22.

As described above, according to the control device 30f of the sixth modification of the first embodiment, the third entrainment control unit 325 calculates the pitch amount 327 of the first drive signal having the tactile presentation waveform. The pitch shifting unit 326 generates the second drive signal by changing the pitch of the first drive signal based on the pitch amount 327 calculated by the third entrainment control unit 325. With this operation, the pitch shifting unit 326 sets the phase offset between the first drive signal and the second drive signal to the target phase offset. Accordingly, the control device 30f can suppress occurrence of a region where tactile presentation fails due to interference between vibrations of the first drive unit 21 and the second drive unit 22. That is, the control device 30f can reproduce tactile presentation with a uniform tactile intensity regardless of the user contact position.

Second Embodiment

Figure 19:
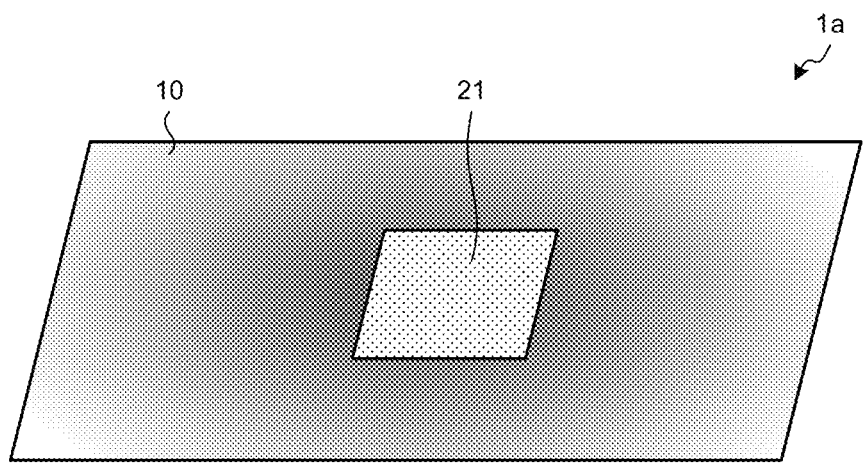
FIG. 19 is a view illustrating tactile presentation on a touch panel display included in an information processing device according to a second embodiment of the present disclosure.

A control device 30g according to a second embodiment will be described. Here, FIG. 19 is a view illustrating tactile presentation on a touch panel display 10 included in an information processing device 1a according to the second embodiment of the present disclosure.

The control device 30g according to the second embodiment includes a first drive unit 21. The first drive unit 21 is an actuator such as a piezoelectric element. In a case where there is only one first drive unit 21, the intensity of tactile presentation on the touch panel display 10 would decrease together with an increase in a separation distance from the first drive unit 21. Accordingly, in a case where there is one first drive unit 21, the intensity of tactile presentation might vary depending on the touch position on the touch panel display 10. In view of this, the control device 30g controls the drive intensity of the first drive unit 21 in accordance with the touch position on the touch panel display 10 and sets the intensity of the tactile presentation to a uniform intensity by this control.

Figure 20:
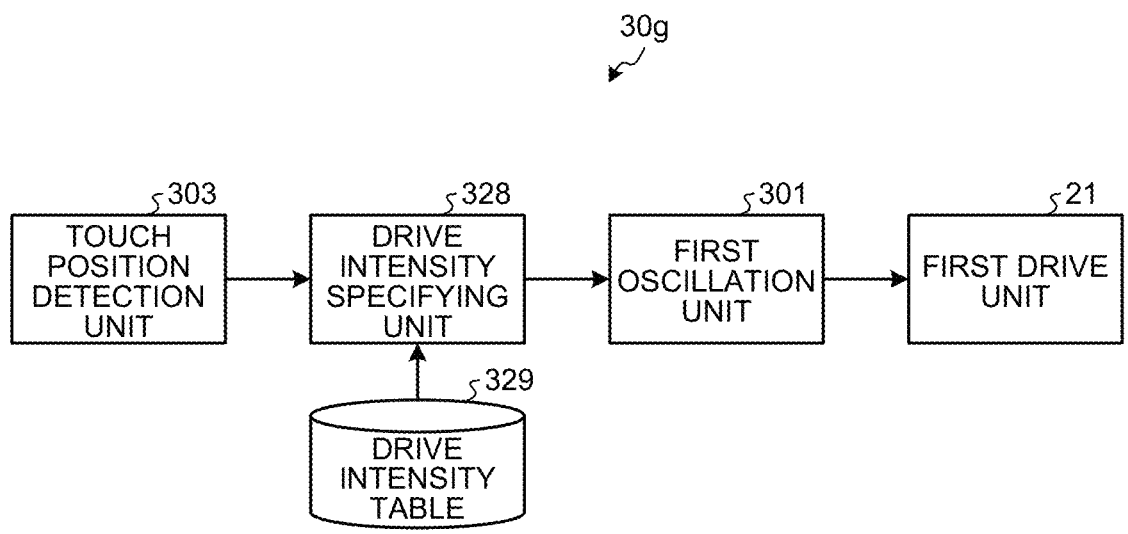
FIG. 20 is a block diagram illustrating an example of a functional configuration of a control device according to the second embodiment of the present disclosure.

FIG. 20 is a diagram illustrating an example of a functional configuration of the control device 30g according to the second embodiment of the present disclosure. The control device 30g according to the second embodiment includes a touch position detection unit 303, a drive intensity specifying unit 328, a drive intensity table 329, and a first oscillation unit 301.

The touch position detection unit 303 detects a user touch position on the touch panel display 10.

Based on the drive intensity table 329, the drive intensity specifying unit 328 specifies the drive intensity of the first drive unit 21 corresponding to each of regions on the touch panel display 10. Here, the drive intensity table 329 has drive intensity setting provided for each of regions on the touch panel display 10. Based on the drive intensity table 329, the drive intensity specifying unit 328 specifies the drive intensity corresponding to the region to which the touch position detected by the touch position detection unit 303 belongs.

The first oscillation unit 301 outputs a drive signal that allows driving with the drive intensity specified by the drive intensity specifying unit 328 to the first drive unit 21.

As described above, according to the control device 30g of the second embodiment, the drive intensity specifying unit 328 specifies the drive intensity of the first drive unit 21 corresponding to each of regions on the touch panel display 10, based on the drive intensity table 329. Therefore, the control device 30g can reproduce tactile presentation with a uniform tactile intensity regardless of the user contact position.

First Modification of Second Embodiment

Figure 21:
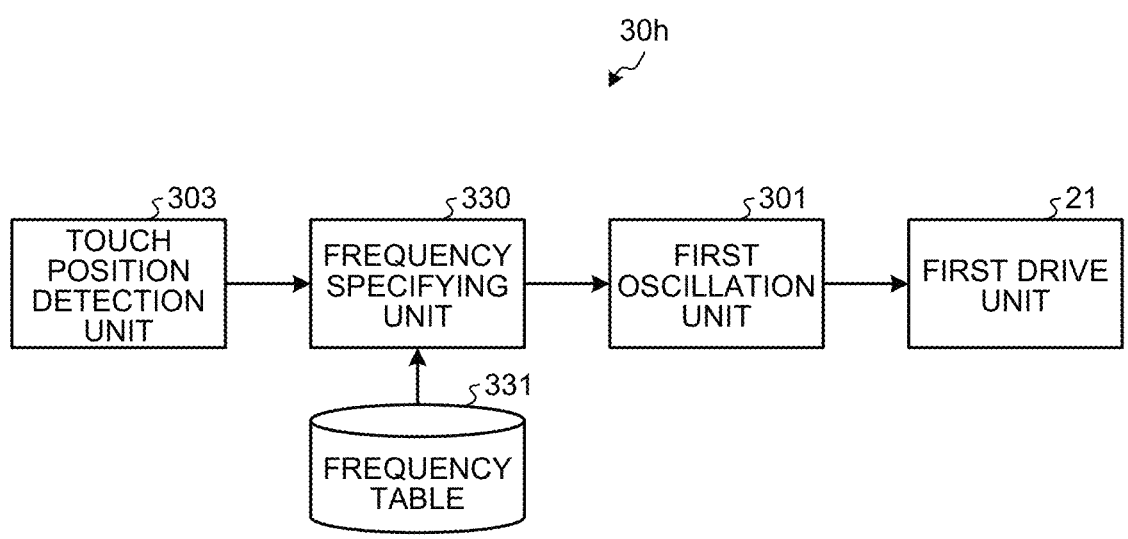
FIG. 21 is a diagram illustrating an example of a functional configuration of a control device according to a first modification of the present disclosure.

A control device 30h according to a first modification of the second embodiment changes the frequency at which the first drive unit 21 is driven, in accordance with the touch position on the touch panel display 10. Here, FIG. 21 is a diagram illustrating an example of a functional configuration of the control device 30h according to the first modification of the present disclosure. The control device 30h according to the first modification of the second embodiment includes a frequency specifying unit 330 instead of the drive intensity specifying unit 328. The control device 30h also includes a frequency table 331.

Even with the same drive intensity, the user might feel higher presentation intensity depending on the vibration method of the first drive unit 21. In view of this, the control device 30h drives the first drive unit 21 at a frequency corresponding to the touch position on the touch panel display 10.

The touch position detection unit 303 detects a user touch position on the touch panel display 10.

Based on the frequency table 331, the frequency specifying unit 330 specifies a frequency corresponding to each of regions on the touch panel display 10. Here, the frequency table 331 has frequency setting provided for each of regions on the touch panel display 10. Based on the frequency table 331, the frequency specifying unit 330 specifies a frequency corresponding to the touch position detected by the touch position detection unit 303. More specifically, the frequency table has frequency settings such that the farther the touch position is from the first drive unit 21, the higher the presentation intensity recognized by the user. In this manner, by setting the frequency that allows the presentation intensity to be recognized as higher intensity with an increase in the separation distance from the first drive unit 21, a uniform presentation intensity can be obtained regardless of how close or far the touch positions are from the first drive unit 21.

The first oscillation unit 301 outputs a signal having the frequency specified by the frequency specifying unit 330 to the first drive unit 21.

As described above, according to the control device 30h of the first modification of the second embodiment, the frequency specifying unit 330 specifies the frequency of the drive signal corresponding to each of regions on the touch panel display 10, based on the frequency table 331. The first oscillation unit 301 oscillates the drive signal at the frequency specified at the frequency specifying unit 330. Subsequently, the first drive unit 21 vibrates with the drive signal oscillated at the frequency specified by the frequency specifying unit 330, and reproduces tactile presentation by this vibration. Therefore, the control device 30h can reproduce tactile presentation with a uniform tactile intensity regardless of the user contact position.

The first embodiment described above is an example in which the presentation intensity is measured with various phase offsets for each of regions on the touch panel display 10, and sets the target phase offset for each of regions onto the target phase offset table 310 by this measurement. However, the method of setting the target phase offset table 310 is not limited to this example. For example, there is a conceivable method of spraying powder on the touch panel display 10. The control device 30 drives the first drive unit 21 and the second drive unit 22 with phase offsets varied for individual regions. An imaging device captures an image of the patterns of the powder in cases where the first drive unit 21 and the second drive unit 22 are driven. The target phase offset for each of the regions may be set onto the target phase offset table 310 based on the patterns of the powder at this time.

Meanwhile, the touch panel display 10 includes a plurality of drive units such as the first drive unit 21 and the second drive unit 22. The touch panel display 10 is not limited to the configuration with two drive units, and may include three or more drive units. Here, the drive unit is, for example, a piezoelectric element. Accordingly, a piezoelectric element may be used as a sensor for measuring the presentation intensity. That is, a piezoelectric element may be used to measure the presentation intensity for each of regions on the touch panel display 10.

In the first embodiment described above, the control device 30 adjusts the frequency stepwise to obtain the target phase offset. That is, the target phase offset, that is, the ideal phase offset has not been obtained at a time point where the user touches the touch panel display 10. In view of this, the control device 30 may include a proximity sensor that detects that the user is immediately before touching the display. The proximity sensor detects that an object such as a user's finger is located in proximity to an arbitrary region. When the proximity sensor detects that an object is approaching an arbitrary region, the touch position detection unit 303 estimates that the object will touch the region. Subsequently, the target phase offset specifying unit 304 specifies a target phase offset corresponding to the region estimated by the touch position detection unit 303. In this manner, the control device 30 starts adjustment of the frequency before the display is touched. This allows the control device 30 to obtain a further ideal phase offset at the time of user's touch.

Furthermore, in a case where the user puts a palm on the touch panel display 10, that is, in a case where the user is simultaneously touching a plurality of regions on the touch panel display 10, the control device 30 may change the phase offset in a short time. More specifically, the control device 30 extracts a plurality of target phase offsets corresponding to a plurality of regions being touched by the user. Then, the control device 30 changes the plurality of extracted target phase offsets in a short time. With this operation, the control device 30 can perform tactile presentation on the entire contact surface.

Meanwhile, the touch panel display 10 includes a plurality of drive units such as the first drive unit 21 and the second drive unit 22. Here, the plurality of drive units may be mutually different types of drive units. In this case, the control device 30 may output a drive signal having a waveform suitable for each of the drive units. In this manner, by inputting a drive signal having a waveform suitable for each of the drive units, the control device 30 can increase the intensity of tactile presentation.

In the description above, the touch panel display 10 according to the first embodiment includes the two drive units, that is, the first drive unit 21 and the second drive unit 22. However, three or more drive units may be disposed on the touch panel display 10. In this case, the control device 30 may select a drive unit to be driven according to the touch position of the user. In this case, the control device 30 drives the selected drive unit. In addition, the control device 30 does not drive the drive unit that has not been selected. In a case where any of the plurality of drive units fails, the control device 30 may drive another drive unit. With this operation, even in a case where any of the drive units fails, the control device 30 can compensate for the intensity of tactile presentation.

In the description above, the control device 30 according to the first embodiment does not change the intensity of tactile presentation in a case where the same position is continuously touched. However, in a case where the same position is being continuously touched, the control device 30 may change the intensity of tactile presentation with the lapse of time. For example, there is a case where it is desired to change the intensity of tactile presentation in accordance with the content displayed on the touch panel display 10. In this case, the control device 30 can change the intensity of the tactile presentation by changing the target phase offset. More specifically, the target phase offset specifying unit 304 changes the target phase offset according to the content displayed on the touch panel display 10. Since this allows the phase offset to change, the control device 30 can change the intensity of tactile presentation, for example, as illustrated in the switching timing in FIG. 3.

Furthermore, there is a case where the control device 30 desires to intentionally produce a position on the touch panel display 10 at which the intensity of tactile presentation is zero. For example, there is a case where it is desired to set the intensity of tactile presentation to zero depending on the content displayed on the touch panel display 10. More specifically, in a case where a plurality of positions is touched, there is a case where it is desired to set the intensity of tactile presentation to zero at any one or more of the plurality of positions and reproduce tactile presentation at the other positions. In this case, the control device 30 stores a target phase offset table that sets the intensity of tactile presentation to zero. Furthermore, the control device 30 extracts the target phase offset corresponding to the touch position based on the target phase offset table. By setting the phase offset to the extracted target phase offset, the control device 30 can intentionally produce a position where the intensity of the tactile presentation is zero.

Effects

The control devices 30, 30*a*, 30*b*, 30*c*, 30*d*, 30*e*, 30*f*, 30*g*, and 30*h* each include the touch position detection unit 303, the target phase offset specifying unit 304, and the first entrainment control unit 307. The touch position detection unit 303 detects a contact position on the touch panel display 10 provided with a plurality of drive units that perform tactile presentation. The target phase offset specifying unit 304 specifies a target phase offset, which is a phase offset being an acquisition target of a plurality of drive signals each of which drives each of the plurality of drive units, based on the contact position detected by the touch position detection unit 303. The first entrainment control unit 307 adjusts the phase offset of the plurality of drive signals so as to obtain the target phase offset specified by the target phase offset specifying unit 304.

By setting the target phase offset, the control device 30 can suppress occurrence of a region where tactile presentation fails due to interference between vibrations of the first drive unit 21 and the second drive unit 22. Therefore, the control device 30 can reproduce tactile presentation with a uniform tactile intensity regardless of the user contact position.

The first entrainment control unit 307 adjusts the phase offset of the plurality of drive signals including the first drive signal and the second drive signal stepwise until the target phase offset is obtained.

In this manner, the first entrainment control unit 307 adjusts the phase offset stepwise so as to suppress an abrupt change in the phase of the second drive signal. With this operation, the control device 30 can prevent generation of abnormal noise, failure to follow the change in the drive signal, and the like.

The target phase offset specifying unit 304 specifies the target phase offset that has been set in the region to which the contact position detected by the touch position detection unit 303 belongs based on the target phase offset table 310 in which the target phase offset is set for each of the plurality of regions of the touch panel display 10.

In this manner, instead of calculating the target phase offset for each of touch positions, the control device 30 sets the target phase offset predetermined for each of regions on the target phase offset table 310. With this operation, the control device 30 can suppress occurrence of a region where tactile presentation fails by facilitated control.

The control device 30 further includes the phase offset measurement unit 305. The phase offset measurement unit 305 measures a phase offset of the plurality of drive signals. The first entrainment control unit 307 changes the oscillation frequency 309 to be the frequency of the second drive signal, thereby setting the phase offset of the plurality of drive signals to the target phase offset.

With this control, the control device 30 can suppress occurrence of a region where tactile presentation fails due to interference between vibrations of the first drive unit 21 and the second drive unit 22. Therefore, the control device 30 can reproduce tactile presentation with a uniform tactile intensity regardless of the user contact position.

The first entrainment control unit 307 adjusts the oscillation frequency 309 within a range up to a predetermined upper limit value and thereby sets the phase offset of the plurality of drive signals to the target phase offset.

In this manner, the control device 30 changes the phase offset stepwise without abruptly changing the phase offset. With this operation, the control device 30 can prevent generation of abnormal noise, failure to follow a change in the drive signal, or the like.

The frequency selection unit 311 selects one frequency from among the plurality of frequencies based on the phase offset of the plurality of drive signals and the target phase offset, and sets the phase offset of the plurality of drive signals including the first drive signal and the second drive signal to the target phase offset, by this selection.

By selecting the frequency in this manner, the control device 30*a* can suppress occurrence of a region where tactile presentation fails due to interference between vibrations of the first drive unit 21 and the second drive unit 22. Consequently, the control device 30*a* can reproduce tactile presentation with a uniform tactile intensity regardless of the user contact position.

The second entrainment control unit 316 controls the rotation amount by which the phase of the second drive signal is to be rotated, and sets the phase offset of the plurality of drive signals to the target phase offset by this control.

With this control of the rotation of the phase, the control device 30*b* can suppress occurrence of a region where tactile presentation fails due to interference between vibrations of the first drive unit 21 and the second drive unit 22. Consequently, the control device 30*b* can reproduce tactile presentation with a uniform tactile intensity regardless of the user contact position.

Based on the first drive signal output to the first drive unit 21, the second phase rotation unit 317 generates the second drive signal obtained by rotating the phase of the first drive signal and sets the phase offset of the plurality of drive signals to the target phase offset by this generating process.

This can obtain the target phase offset, and thus, the control device 30*c* can suppress occurrence of a region where tactile presentation fails due to interference between vibrations of the first drive unit 21 and the second drive unit 22. Consequently, the control device 30c can reproduce tactile presentation with a uniform tactile intensity regardless of the user contact position.

The LPF 318 removes the high frequency component of the signal to be the basis of the second drive signal for a predetermined time period from the time of phase rotation of the first drive signal.

Since this can remove a high frequency component, the control device 30d can prevent generation of abnormal noise, failure to follow a change in the drive signal.

Each of the plurality of drive signals including the first drive signal and the second drive signal is a tactile presentation waveform indicating a waveform that reproduces tactile presentation.

With this configuration, the control device 30e can reproduce tactile presentation.

The delay amount control unit 320 controls a delay amount by which any of the plurality of drive signals including the first drive signal and the second drive signal is to be delayed, and sets the phase offset of the plurality of drive signals to the target phase offset by this control.

This can obtain the target phase offset, and thus, the control device 30e can suppress occurrence of a region where tactile presentation fails due to interference between vibrations of the first drive unit 21 and the second drive unit 22. Consequently, the control device 30e can reproduce tactile presentation with a uniform tactile intensity regardless of the user contact position.

The first band-pass filter 322 and the second band-pass filter 323 extract a predetermined band from each of a plurality of drive signals having a tactile presentation waveform. The delay amount control unit 320 sets the phase offset of the plurality of drive signals including the first drive signal and the second drive signal in the band extracted by the first band-pass filter 322 and the second band-pass filter 323, to the target phase offset.

With this operation, even when the first drive signal and the second drive signal have a tactile presentation waveform instead of a sine wave, the control device 30e can set the phase offset between the first drive signal and the second drive signal to the target phase offset. Accordingly, the control device 30e can suppress occurrence of a region where tactile presentation fails due to interference between vibrations of the first drive unit 21 and the second drive unit 22.

The third entrainment control unit 325 controls a pitch amount of any drive signal out of the plurality of drive signals and thereby sets the phase offset of the plurality of drive signals to the target phase offset.

This can obtain the target phase offset, and thus, the control device 30f can suppress occurrence of a region where tactile presentation fails due to interference between vibrations of the first drive unit 21 and the second drive unit 22. Consequently, the control device 30f can reproduce tactile presentation with a uniform tactile intensity regardless of the user contact position.

The first drive unit 21 and the second drive unit 22 are piezoelectric elements to be driven by application of a voltage.

With this configuration, the control devices 30, 30a, 30b, 30c, 30d, 30e, 30f, 30g, and 30h can perform tactile presentation by applying a voltage.

The effects described in the present specification are merely examples, and thus, there may be other effects, not limited to the exemplified effects.

Note that the present technology can also have the following configurations.

(1)

A control device comprising:
- a detection unit that detects a contact position on a display provided with a plurality of drive units configured to perform tactile presentation;
- a specifying unit that specifies, based on the contact position detected by the detection unit, a target phase offset being a phase offset as an acquisition target of a plurality of drive signals each of which drives each of the plurality of drive units; and
- a phase offset control unit that adjusts the phase offset of the plurality of drive signals so as to obtain the target phase offset specified by the specifying unit.

(2)

The control device according to (1),
wherein the phase offset control unit adjusts the phase offset of the plurality of drive signals stepwise until the target phase offset is obtained.

(3)

The control device according to (1) or (2),
wherein the specifying unit specifies the target phase offset set in the region to which the contact position detected by the detection unit belongs, based on target phase offset information in which the target phase offset is set for each of a plurality of regions on the display.

(4)

The control device according to any one of (1) to (3), further comprising
a measurement unit that measures the phase offset of the plurality of drive signals,
wherein the phase offset control unit sets the phase offset of the plurality of drive signals to the target phase offset based on the target phase offset and on the phase offset measured by the measurement unit.

(5)

The control device according to any one of (1) to (4),
wherein the phase offset control unit changes a frequency of the drive signal and thereby sets the phase offset of the plurality of drive signals to the target phase offset.

(6)

The control device according to (5),
wherein the phase offset control unit adjusts the frequency within a range up to a predetermined upper limit value, and sets the phase offset of the plurality of drive signals to the target phase offset by this adjustment.

(7)

The control device according to (1),
in which the phase offset control unit selects one frequency from among a plurality of frequencies based on the phase offset of the plurality of drive signals and the target phase offset, and adjusts the phase offset of the plurality of drive signals by this selection.

(8)

The control device according to (1),
wherein the phase offset control unit controls a rotation amount by which a phase of the drive signal is to be rotated, and sets the phase offset of the plurality of drive signals to the target phase offset by this control.

(9)

The control device according to (1),
wherein the phase offset control unit generates, from a first drive signal to be output to a first drive unit, a second drive signal obtained by rotating a phase of the first drive signal, and sets the phase offset of the plurality of drive signals to the target phase offset by this signal generation.

(10)

The control device according to (9), further comprising a removal unit that removes a high frequency component of the second drive signal.

(11)

The control device according to (10),
wherein the removal unit removes the high frequency component of the second drive signal for a predetermined time period from a phase rotation time of the first drive signal.

(12)

The control device according to any one of (1) to (11), wherein each of the plurality of drive signals has a tactile presentation waveform indicating a waveform that reproduces tactile presentation.

(13)

The control device according to (12),
wherein the phase offset control unit controls a delay amount by which any of the plurality of drive signals is to be delayed and sets the phase offset of the plurality of drive signals to the target phase offset by this control.

(14)

The control device according to (12) or (13), further comprising
an extraction unit that extracts a predetermined band from each of the plurality of drive signals having the tactile presentation waveform,
wherein the phase offset control unit sets the phase offset of the plurality of drive signals in the band extracted by the extraction unit, to the target phase offset.

(15)

The control device according to (14),
wherein the phase offset control unit controls a pitch amount of any drive signal out of the plurality of drive signals, and sets the phase offset of the plurality of drive signals to the target phase offset by this control.

(16)

The control device according to any one of (1) to (15), wherein the drive unit is a piezoelectric element that is driven by application of voltage.

(17)

A control method comprising:
detecting a contact position on a display provided with a plurality of drive units configured to perform tactile presentation;
specifying, based on the detected contact position, a target phase offset being a phase offset as an acquisition target of a plurality of drive signals each of which drives each of the plurality of drive units; and
adjusting the phase offset of the plurality of drive signals so as to obtain the specified target phase offset.

(18)

A control program for causing a computer included in a control device to function as:
a detection unit that detects a contact position on a display provided with a plurality of drive units configured to perform tactile presentation;
a specifying unit that specifies, based on the contact position detected by the detection unit, a target phase offset being a phase offset as an acquisition target of a plurality of drive signals each of which drives each of the plurality of drive units; and
a phase offset control unit that adjusts the phase offset of the plurality of drive signals so as to obtain the target phase offset specified by the specifying unit.

REFERENCE SIGNS LIST 1, 1a INFORMATION PROCESSING DEVICE
10 TOUCH PANEL DISPLAY
21 FIRST DRIVE UNIT
22 SECOND DRIVE UNIT
30, 30a, 30b, 30c, 30d, 30e, 30f, 30g, 30h CONTROL DEVICE
37 PROGRAM DATA
301 FIRST OSCILLATION UNIT
302 SECOND OSCILLATION UNIT
303 TOUCH POSITION DETECTION UNIT
304 TARGET PHASE OFFSET SPECIFYING UNIT
305 PHASE OFFSET MEASUREMENT UNIT
306 PHASE OFFSET DIFFERENCE CALCULATION UNIT
307 FIRST ENTRAINMENT CONTROL UNIT
310 TARGET PHASE OFFSET TABLE
311 FREQUENCY SELECTION UNIT
315 FIRST PHASE ROTATION UNIT
316 SECOND ENTRAINMENT CONTROL UNIT
317 SECOND PHASE ROTATION UNIT
318 LPF
319 TACTILE PRESENTATION WAVE OUTPUT UNIT
320 DELAY AMOUNT CONTROL UNIT
321 DELAY UNIT
322 FIRST BAND-PASS FILTER
323 SECOND BAND-PASS FILTER
325 THIRD ENTRAINMENT CONTROL UNIT
326 PITCH SHIFTING UNIT
328 DRIVE INTENSITY SPECIFYING UNIT
329 DRIVE INTENSITY TABLE
330 FREQUENCY SPECIFYING UNIT
331 FREQUENCY TABLE

The invention claimed is:

1. A control device, comprising:
a detection unit configured to detect a contact position on a display provided with a plurality of drive units that performs tactile presentation;
a specifying unit configured to specify, based on the contact position detected by the detection unit, a target phase offset being a phase offset as an acquisition target of a plurality of drive signals each of which drives each of the plurality of drive units; and
a phase offset control unit configured to adjust the phase offset of the plurality of drive signals so as to obtain the target phase offset specified by the specifying unit.

2. The control device according to claim 1,
wherein the phase offset control unit is further configured to adjust the phase offset of the plurality of drive signals stepwise until the target phase offset is obtained.

3. The control device according to claim 1,
wherein the specifying unit is further configured to specify the target phase offset set in a region to which the contact position detected by the detection unit belongs, based on target phase offset information in which the target phase offset is set for each of a plurality of regions on the display.

4. The control device according to claim 1, further comprising
a measurement unit configured to measure the phase offset of the plurality of drive signals, wherein the phase offset control unit is further configured to set the phase offset of the plurality of drive signals to the target phase offset based on the target phase offset and on the phase offset measured by the measurement unit.

5. The control device according to claim 1, wherein the phase offset control unit is further configured to:
change a frequency of a drive signal of the plurality of drive signals; and
set the phase offset of the plurality of drive signals to the target phase offset.

6. The control device according to claim 5, wherein the phase offset control unit is further configured to:
adjust the frequency within a range up to an upper limit value; and
set the phase offset of the plurality of drive signals to the target phase offset by the adjustment of the frequency.

7. The control device according to claim 1, wherein the phase offset control unit is further configured to:
select one frequency from among a plurality of frequencies based on the phase offset of the plurality of drive signals and the target phase offset; and
set the phase offset of the plurality of drive signals to the target phase offset by the selection of the one frequency.

8. The control device according to claim 1, wherein the phase offset control unit is further configured to:
control a rotation amount by which a phase of a drive signal of the plurality of drive signals is to be rotated; and
set the phase offset of the plurality of drive signals to the target phase offset by the control of the rotation amount.

9. The control device according to claim 1, wherein the phase offset control unit is further configured to:
generate, from a first drive signal to be output to a first drive unit, a second drive signal obtained by rotation of a phase of the first drive signal; and
set the phase offset of the plurality of drive signals to the target phase offset by the generation of the second drive signal.

10. The control device according to claim 9, further comprising
a removal unit configured to remove a high frequency component of the second drive signal.

11. The control device according to claim 10, wherein the removal unit is further configured to remove the high frequency component of the second drive signal for a time period from a phase rotation time of the first drive signal.

12. The control device according to claim 1, wherein each of the plurality of drive signals has a tactile presentation waveform indicating a waveform that reproduces the tactile presentation.

13. The control device according to claim 12, wherein the phase offset control unit is further configured to:
control a delay amount by which any of the plurality of drive signals is to be delayed; and
set the phase offset of the plurality of drive signals to the target phase offset by the control of the delay amount.

14. The control device according to claim 12, further comprising
an extraction unit configured to extract a band from each of the plurality of drive signals having the tactile presentation waveform,
wherein the phase offset control unit is further configured to set the phase offset of the plurality of drive signals in the band extracted by the extraction unit, to the target phase offset.

15. The control device according to claim 1, wherein the phase offset control unit is further configured to:
control a pitch amount of a drive signal out of the plurality of drive signals; and
set the phase offset of the plurality of drive signals to the target phase offset by the control of the pitch amount.

16. The control device according to claim 1,
wherein a drive unit of the plurality of drive units is a piezoelectric element that is driven by application of a voltage.

17. A control method, comprising:
detecting a contact position on a display provided with a plurality of drive units that performs tactile presentation;
specifying, based on the detected contact position, a target phase offset being a phase offset as an acquisition target of a plurality of drive signals each of which drives each of the plurality of drive units; and
adjusting the phase offset of the plurality of drive signals so as to obtain the specified target phase offset.

18. A non-transitory computer-readable medium having stored thereon computer-executable instructions which, when executed by a computer, cause the computer to execute operations, the operations comprising:
detecting a contact position on a display provided with a plurality of drive units that performs tactile presentation;
specifying, based on the detected contact position, a target phase offset being a phase offset as an acquisition target of a plurality of drive signals each of which drives each of the plurality of drive units; and
adjusting the phase offset of the plurality of drive signals so as to obtain the specified target phase offset.

* * * * *